(12) United States Patent
Lindo et al.

(10) Patent No.: US 7,506,318 B1
(45) Date of Patent: Mar. 17, 2009

(54) RECORDING AND REPLAYING COMPUTER PROGRAMS

(75) Inventors: Jonathan Lindo, Los Altos, CA (US); Jeffrey Daudel, South San Francisco, CA (US)

(73) Assignee: Replay Solutions, Inc., Redwood City, CA (US)

( * ) Notice: Subject to any disclaimer, the term of this patent is extended or adjusted under 35 U.S.C. 154(b) by 682 days.

(21) Appl. No.: 11/169,522

(22) Filed: Jun. 28, 2005

(51) Int. Cl.
 *G06F 9/44* (2006.01)
(52) U.S. Cl. ...................................... 717/130; 717/131
(58) Field of Classification Search .......... 717/130–131
 See application file for complete search history.

(56) References Cited

U.S. PATENT DOCUMENTS

| | | | | |
|---|---|---|---|---|
| 6,665,249 | B2 * | 12/2003 | Liew | 369/59.1 |
| 6,832,367 | B1 * | 12/2004 | Choi et al. | 717/130 |
| 2003/0212983 | A1 * | 11/2003 | Tinker | 717/110 |

OTHER PUBLICATIONS

Press Release, "Replay Solutions is chosen by developer Ion Storm for their latest title, 'Thief: Deadly Shadows'" Redwood City, CA—Mar. 20, 2004, available at http://www.replaysolutions.com/news/news.php?id=1.*
King et al., "Debugging operating systems with time-traveling virtual machines", originally published in the Proceedings of the 2005 USENIX Annual Technical Conference, Apr. 10-15, 2005, Anaheim, CA, USA.*
Ronsse et al., "Record/Replay for Nondeterministic Program Executions", ACM Communications, 2003, vol. 46, Part 9, pp. 62-68.*
Ronsse et al., "RecPlay: a fully integrated practical record/replay system", ACM Transactions on Computer Systems, 1999, vol. 17, Issue 2.*
Xu et al., "A 'Flight Data Recorder' for Enabling Full-system Muiltiprocessor Deterministic Replay", 30th Annual International Symposium on Computer Architecture (ISCA-30) San Diego, CA, Jun. 9-11, 2003.*
Jonathan Lindo, et al., "Building a Reusable Replay System," game tech 2004, copyright Replay Solutions, LLC 2004, 12 pgs.
"Replay Solutions, LLC Accelerating You To Market," Replay Director v2.0, dated Apr. 12, 2005, 7 pgs.
"ReplayDirector,"XBOX User's Guide, located at http://www.ReplaySolutions.com, Revision A, dated May 2005, 12 pgs.
ReplayDirector, User's Guide, located at http://www.ReplaySolutions.com, Revision D, dated Jun. 2004, 10 pgs.

* cited by examiner

*Primary Examiner*—Wei Y Zhen
*Assistant Examiner*—Ryan D Coyer
(74) *Attorney, Agent, or Firm*—Hickman Palermo Truong & Becker LLP

(57) ABSTRACT

A method is disclosed for recording and replaying computer programs. In one embodiment, a method of modifying a computer program to support recording execution, comprises the computer-implemented steps of receiving an executable application binary; modifying the executable application binary by adding one or more proxy code elements to result in creating a modified application binary, wherein upon execution of the modified application binary, the one or more proxy code elements create and store recorded information representing all non-deterministic events that occur during the execution. For example, asynchronous callbacks and thread context switches are recorded and can be replayed.

48 Claims, 16 Drawing Sheets

RECORDING AND REPLAYING COMPUTER PROGRAMS

FIELD OF THE INVENTION

The present invention generally relates to computer software development processes and systems. The invention relates more specifically to approaches for recording and replaying information relating to a computer program as the program is executing.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Computer software development often involves several progressive phases such as definition, coding, quality assurance (QA) and testing, error removal or "debugging," and maintenance. In commercial software development, testing and debugging often consumes considerable time, and may account for the largest time component in a development project. Traditional bug fixing requires detailed communication between testers and developers. Time is often wasted going back and forth between testers and developers trying to reproduce and isolate problems. Verifying that a bug has been fixed is error-prone and time consuming. Therefore, software developers are continually looking for ways to reduce the amount of time spent on testing and debugging.

One approach is to outsource QA and testing to test personnel in another location, even another country. However, outsourcing can involve language barriers and communication barriers when a developer prepares and sends written bug reports in a local language to QA personnel in another country who speak another language. Distance barriers, and complications arising from having developers and testers in different physical locations or even different time zones also can exist. Developers would like to have a software testing solution that facilitates communication in an outsourced environment.

Scheduling QA testing within the software development cycle can be difficult. Finding and fixing bugs is unpredictable, at best. Delays in QA testing can lead to late releases, missed market windows, and lost revenue. These issues may be acute in the fast-paced environment involved in developing computer games for platforms such as PC, Microsoft XBOX family, Sony Playstation family, Nintendo, etc.

To address these issues, several types of program execution recording systems have been developed. Generally, program-recording systems record information about a program under test as the program executes, and provide reports about that information. However, consistently reproducing bugs is a serious problem in software development, and achieving it typically involves expending significant resources. Some systems facilitate replaying program execution on a repeated basis. Using these systems, debugging is improved because bugs are reproducible by replaying a particular program execution session.

Types of program recording systems include external I/O recorders, source code instrumenters, and binary patching systems. Generally, external I/O recorders create and store recordings of network I/O operations, user input, and graphics or display 3-D (D3D) information. External I/O recorders may be use to simulate such external input to a program. External I/O recorders do not require any modifications to program code, are robust in response to code and asset changes, and can be used for cross-platform testing and demos. However, external I/O recorders may not produce accurate program replays due to timing issues, such as irregular network delays, or race conditions. Further, external I/O recorders may be unusable with some platforms for security reasons. External I/O recorders do not account for non-determinism in programs associated with thread context switching. External I/O recorders are sometimes termed macro recorders. A commercial example is Mercury Interactive's WinRunner.

Source code instrumenters usually provide proxy API libraries and modules; a developer must include the libraries or modules in source code for testing purposes. Source code instrumenters are somewhat reusable, can be easily expanded and tuned, and recordings may be portable across platforms. However, source code instrumenters are applicable only to modules for which program source code is available; they cannot be used to debug programs for which only executable machine code is available. Source code instrumenters typically require the use of a specialized API for certain calls by the developer, or a code-parsing module. Thus, the developer shoulders the burden of inserting the correct API calls in the source code of the program under test. Further, source code instrumenters provide no support for third-party modules such as dynamic linked libraries (DLLs) or linked executables, because such modules will not contain the required API calls at the time of testing. Source code instrumenters may not provide 100% accurate replays due to the effect of external events that are not trapped and recorded.

Binary patching systems operate by adding specialized recording code to the binary machine code of a program under test after compilation. A commercial example is Rational Purify. Binary patching systems are highly reusable and can produce accurate recordings by capturing detailed operational data. Binary patching systems do not require source code modifications, and can be applied to any executable, library or DLL. When disabled, binary patching systems do not affect program execution or size. Binary patching systems can capture low-level program calls, e.g., calls to hardware elements.

However, binary patching systems can be fragile when code or assets change. A recording of a program of a first version may be incompatible for replay when the program is modified to a later version. Binary patching systems may require special support for certain APIs, such as those relating to networking. Binary patching systems typically require special support for different processors having different machine instruction sets, and for different binary file formats (e.g., PE, XBE, ELF). Binary patching systems do not readily produce recordings that are portable across platforms. Further, cross-module inlining of code (e.g., using Link Time Code Generation (LTCG)) can distort function boundaries and make patching inaccurate.

In addition, known binary patching systems are not capable of recording all sources of non-determinism that may exist in an application.

Based on the foregoing, there is a clear need for an improved way to identify and reproduce bugs in a computer program that is undergoing development, QA or test.

Users in this field would appreciate having a solution that could save money in the process of bringing a product to market and shorten the software development cycle. Users also seek a solution that has little impact on existing software development workflows. For example, users would prefer a solution that does not require developers to use new application programming interfaces (APIs) and that does not impose new requirements on the development process. Users also wish to have solutions that facilitate outsourcing by eliminating the need for detailed bug reports, add predictability to scheduling QA testing, and optimize the QA process.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1A:
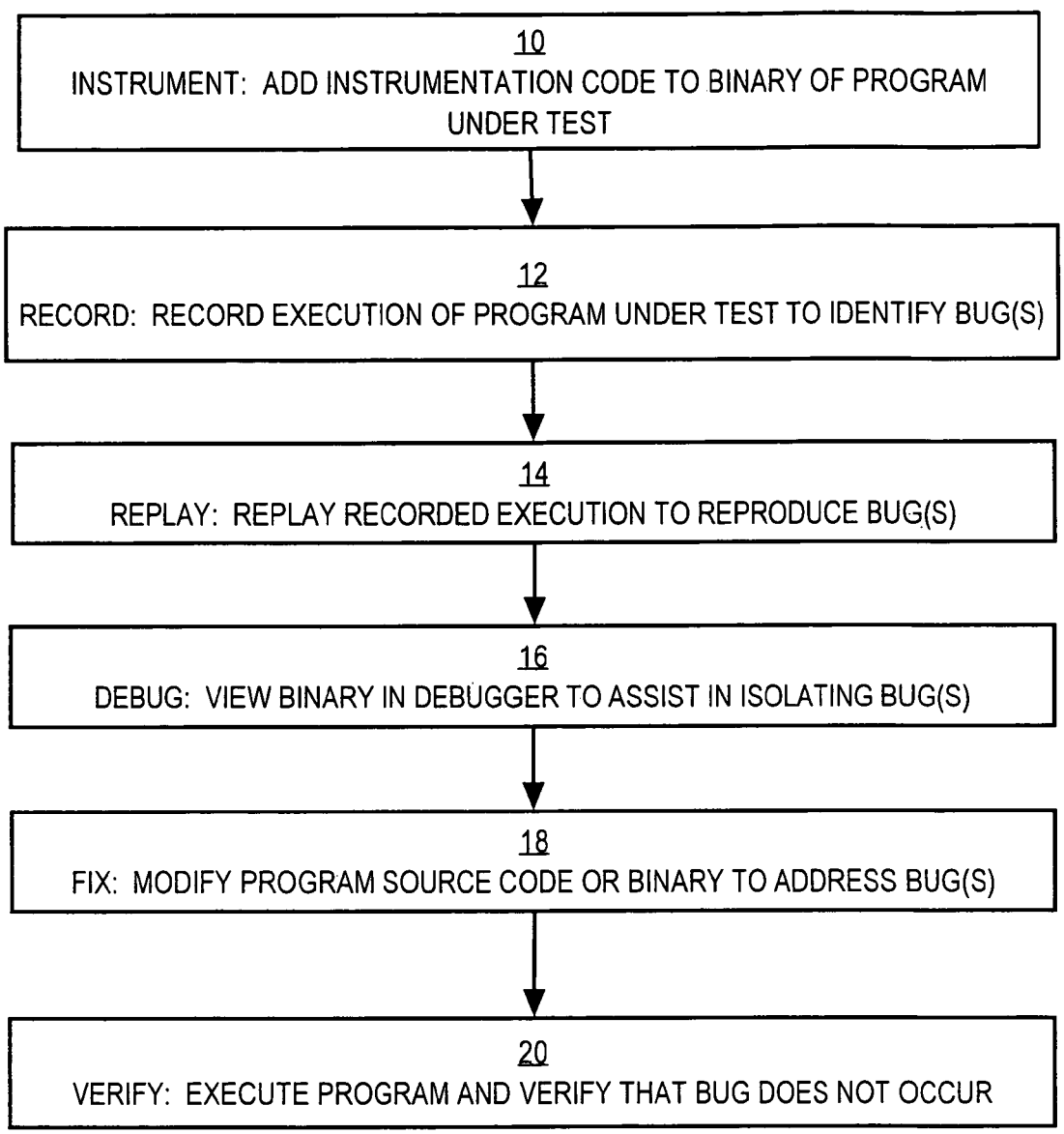
FIG. 1A is a flow diagram of a method of testing a computer program.

A method and apparatus for recording and replaying computer programs is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:
1.0 General Overview
2.0 Structural and Functional Overview
3.0 Methods For Recording And Replaying A Computer Program
   3.1 Recording a Replay Stream Representing Program Execution
      3.1.1 Recording Asynchronous Callbacks
      3.1.2 Recording Exceptions
      3.1.3 Recording Thread Context Switches
      3.1.4 Shared Memory Access
      3.1.5 Memory Management
      3.1.6 Efficient Storage of Recorded Replay Data
   3.2 Replaying a Replay Stream
      3.2.1 Replaying on Different Machines
      3.2.2 Fast Forwarding and Skipping State
      3.2.3 Replaying Data Values Read from Non-Initialized Memory
   3.3 Example Replay Stream Data Format
   3.4 Approaches for Applying Instrumentation Code to Program Binaries
4.0 Software Development Management Using Replay System
   4.1 User Interface Example
   4.2 Example Bug Communication Process
   4.3 Other Uses and Benefits
5.0 Implementation Mechanisms—Hardware Overview
6.0 Extensions and Alternatives 1.0 GENERAL OVERVIEW The needs identified in the foregoing Background, and other needs and objects that will become apparent for the following description, are achieved in the present invention, which comprises, in one aspect, a method is disclosed for recording and replaying computer programs. In one embodiment, a method of modifying a computer program to support recording execution, comprises the computer-implemented steps of receiving an executable application binary; modifying the executable application binary by adding one or more proxy code elements to result in creating a modified application binary, wherein upon execution of the modified application binary, the one or more proxy code elements create and store recorded information representing all non-deterministic events that occur during the execution. For example, asynchronous callbacks and thread context switches are recorded and can be replayed.

In one feature of this aspect, the method further comprises receiving user input requesting replaying the execution; in response to the user input, replaying the execution of the modified application binary, wherein replaying includes providing the modified application binary with the recorded information representing all the non-deterministic events that occurred during the execution. In one feature, the non-deterministic events include network input/output, file input/output, user input events, initiation of threads, interrupts, thread context switches, timer queries, shared memory accesses, and asynchronous system callbacks.

In another feature, modifying the executable application binary includes adding recording buffer logic to the application binary, wherein the recording buffer logic buffers the recorded information in a buffer memory and stores the recorded information in a persistent data store only in response to occurrence of an exception during the execution.

In still another features, modifying the executable application binary includes adding one or more proxy asynchronous callback handlers to the application binary, wherein the one or more proxy asynchronous callback handlers intercept each asynchronous callback that occurs during the execution and store information associated with the asynchronous callback in the recorded information. Further, modifying the executable application binary may include adding one or more proxy asynchronous callback handlers to the application binary; wherein the one or more proxy asynchronous callback handlers intercept each asynchronous callback that occurs during the execution and store information associated with the asynchronous callback in the recorded information; wherein during the replaying, the one or more proxy asynchronous callback handlers allow the asynchronous callback to pass through to the application binary only when the asynchronous callback occurs at a same sequential execution point as during the execution. In a related feature, the one or more proxy asynchronous callback handlers generate and provide the application binary with missing asynchronous callback information when the asynchronous callback occurs during the execution but not during the replaying.

In another feature, modifying the executable application binary includes adding one or more proxy exception handlers to the application binary, wherein the one or more proxy exception handlers intercept each exception that occurs during the execution and store information associated with the exception in the recorded information. Further, modifying the executable application binary may include adding one or more proxy exception handlers to the application binary; wherein the one or more proxy exception handlers intercept each exception that occurs during the execution and store information associated with the exception in the recorded information; wherein during the replaying, the one or more proxy exception handlers allow the exception to pass through to the application binary only when the exception occurs at a same sequential execution point as during the execution.

In a related feature, the one or more proxy exception handlers generate and provide the application binary with missing exception information when the exception occurs during the execution but not during the replaying. In still another feature, the one or more proxy exception handlers filter out the exception as an extraneous exception when the exception occurs during the replaying but is not in the recorded information.

In yet another feature, modifying the executable application binary includes adding one or more hardware access proxy handlers to the application binary, wherein the one or more hardware access proxy handlers intercept and suppress requests of the application binary to access one or more hardware features that are not within a specified baseline hardware configuration.

In still another feature, modifying the executable application binary comprises determining one or more assembler instructions that correspond to one or more machine instructions in the application binary; identifying one or more particular assembler instructions that perform non-deterministic system function calls; substituting one or more jump instructions, which reference proxy code for intercepting and recording information associated with the non-deterministic system function calls that occur during the execution, for the particular assembler instructions. For example, substituting includes determining that the jump instructions require more space in the application binary than occupied by the particular assembler instructions, and moving an atomic block of instructions to another location in the application binary to provide room for the jump instructions. Further, the proxy code may be added to an end of the executable application binary. In yet another feature, moving an atomic block includes adding a return jump instruction to the atomic block that causes execution after the atomic block to resume at a same end point in the application binary at which the atomic block ended prior to the moving.

According to one feature, upon execution of the modified application binary, the one or more proxy code elements create and store recorded information representing all non-deterministic events that occur during the execution, without adversely affecting performance of the application binary during the execution.

In a further feature, modifying the executable application binary includes adding a memory request handler to the application binary, wherein during the replaying or during the execution, the memory request handler receives a request for a memory allocation from the application binary, provides a system memory allocation request to an operating system, receives a copy of memory values associated with memory that the system has allocated in response to the system memory allocation request, initializes the copy of memory values with new memory values, and provides the new memory values to the application binary. The memory request handler may initialize the copy of memory values with new memory values by generating a plurality of pseudo-random values based on a deterministic pseudo-random function and a specified seed value. The specified seed value may be stored in the recorded information during the execution.

In other aspects, the invention encompasses a computer apparatus and a computer-readable medium configured to carry out the foregoing steps.

2.0 STRUCTURAL AND FUNCTIONAL OVERVIEW

FIG. 1A is a flow diagram of a method of testing a computer program. Generally, the method of FIG. 1A involves steps to instrument, record, replay, debug, fix, and verify. In step 10, Instrument, one or more elements of instrumentation code are added to a binary file representing a program under test. The binary file is an executable version of an application program that needs to be tested, debugged, verified, or otherwise examined. The instrumentation code intercepts or traps certain application operations and records data relating to the operations. Specific approaches for performing binary instrumentation are described further below.

In this description, the terms application, program under test, and binary file refer interchangeably to a user software program that executes instructions. The term operating system or system refers to the low-level software program that a software application interacts with, and which isolates an application from directly interfacing computer hardware in most cases. The term replay system refers to a software program that interacts with both the application and the system and acts an intermediary between the two. It has two modes: record and replay. During record it captures data from non-deterministic function outputs. During replay, it writes the previous data back into nondeterministic function outputs.

In step 12, Record, execution of the program under test is recorded to identify one or more bugs. For example, the program under test is started, and a user interacts with the program according to the normal manner of using the program. Depending on the goals of the user, the user provides input or otherwise manipulates the program until a bug is found by observation of program performance. For example, the program may crash, provide unexpected output, etc.

Recording execution of a program involves programmatically capturing and storing information identifying all sources of non-determinism that may affect the program.

Replay stream information is stored in persistent storage and identifies non-deterministic events. Specific approaches for performing recording of non-deterministic events are described further below. Test personnel can attach the stored replay stream information for a portion of a program that contains a bug results to a bug report and send the bug report to a developer.

Many mechanisms may provide non-deterministic input to a program. For example, some known sources of non-determinism include user input, programmatic timers, asynchronous callbacks, thread context switching, direct memory access (DMA) timing, shared memory access, and interrupts. In an embodiment, information identifying all the foregoing non-deterministic sources is recorded and stored as a program executes, and replayed in at Replay step 14.

A source of non-determinism in the form of user input may include input from a keyboard, mouse, joystick, or other device, which varies in timing and in value across different sessions of use of a program.

Non-deterministic input from programmatic timers includes any query to a system clock that a program performs. In the context of game software development, for example, timer queries are commonly used to support simulations of physical movement, changes in on-screen character position in networked games based on timer interpolation or dead reckoning, etc. Further, game code may operate on different execution paths depending on the amount of time that has passed between actions.

Asynchronous callbacks are considered non-deterministic because it is not possible to predict when callbacks will arrive for tasks that a program has "handed off" to an operating system routine or to another program. For example, the operating system may require a different amount of time to perform such tasks depending on network conditions, resource conditions, etc.

Thread context switching is non-deterministic because the time at which a CPU switches from executing one thread to another is not readily predictable, so that the order of operations performed by multiple threads may vary, and therefore the path of execution in code may vary among execution sessions. DMA timing is non-deterministic because the state of system main memory can change between successive program accesses to the memory if system hardware performs intervening DMA accesses. Shared memory access is a source of non-determinism because multiple threads may set values in shared memory at different times without informing the application under test. Interrupt routines are potential sources of non-determinism, and therefore interrupt routines are trapped and replayed.

In step 14, Replay, execution of the program is replayed, by running the program and substituting information from the stored replay stream for all non-deterministic events that are associated with a recorded execution. Specific approaches for performing replay are described further below. The Replay step can be performed by a developer who has received a bug report that contains an attached replay stream recording. Thus, the approaches herein enable the developer to immediately reproduce the bug by replaying the recorded replay stream.

Typically, Replay at step 14 concludes at a point in program execution at which a bug occurs. In step 16, Debug, a debugger program is started and loaded with the program binary. A user can set breakpoints in the debugger at points in the binary that may be close to code containing a bug, modify machine instructions in an attempt to remove the bug, etc., or otherwise use the debugger to solve problems associated with one or more bugs. Step 18, Fix, represents applying such fixes using a debugger, or modifying program source code and recompiling the source code into a new binary executable file. Typically steps 16, 18 are also performed by a developer who has received a bug report with a stored replay stream.

In step 20, Verify, the program is executed again, using the replay stream, to verify that the bug does not occur or has been eliminated. Typically, step 20 is performed by test personnel after receiving communication from developers that a bug has been removed.

The approach of FIG. 1A facilitates an efficient, fast method of detecting and eliminating bugs in computer programs. Redundant cycles in the bug fix workflow are eliminated. There is no need for back-and-forth communication between the tester and the developer to collect additional bug information. The recorded replay stream provides all information that the developer needs to reproduce a bug found by a tester. Verifying removal of a bug is as simple as replaying the recording of the bug to verify that program operation meets expectations.

Figure 1B:
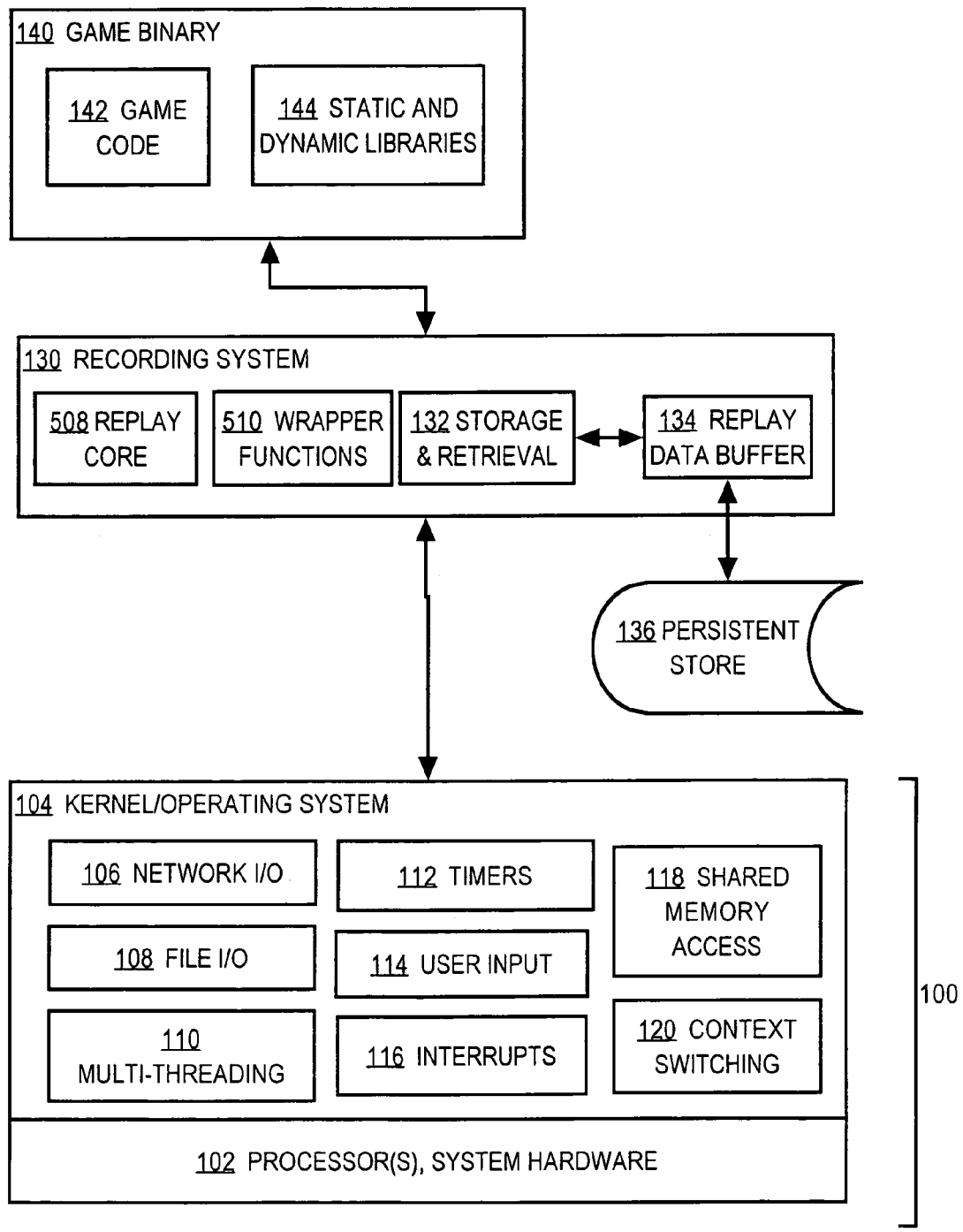
FIG. 1B is a block diagram of a computer system that includes a recording system.

FIG. 1B is a block diagram of a computer system that includes a recording system according to an embodiment. A computer system 100 includes one or more processors and other system hardware such as video graphics electronics, memory, and storage, collectively designated as hardware 102, which hosts an operating system 104. The operating system 104 provides interfaces to hardware 102 for application programs, and supervises and controls the application programs. Thus, in most cases operating system 104 isolates the application from the hardware. In one embodiment, operating system 104 is based upon a kernel element, but a kernel-based OS is not required.

Operating system 104 also includes one or more sources of non-determinism that affect execution of an application program that the operating system supervises. In one embodiment, sources of non-determinism may include a network I/O module 106, file I/O module 108, multi-threading module 110, timers 112, user input 114, interrupts 116, shared memory access 118, and context switching events 120.

A replay system 130 runs on operating system 104. The replay system 130 is configured to programmatically capture and store information identifying all sources of non-determinism that may affect the program, create and store replay stream information in persistent storage and that identifies non-deterministic events, and to replay a program under test while supplying the replay information.

In the example of FIG. 1B, game binary 140 is a program under test, and represents a binary executable version of a game computer program. Game binary 140 comprises game code 142, representing machine code for a game, and one or more static libraries or DLLs 144. Replay system 130 is shown logically between game binary 140 and operating system 104 because, during the Instrument step 10 of FIG. 1A, the recording system modifies the game binary in a way that logically inserts the recording system between the game binary and the operating system. Further, the Record step of FIG. 1A, during execution of game binary 140, replay system 130 intercepts all requests of the game code 142 to use services of operating system 104, such as services of modules 106-120, and the recording system services all such requests instead. In the Replay step 14 of FIG. 1A, replay system 130 provides all information that the services of modules 106-120 actually provided during the first execution and recording.

Replay system 130 also includes replay core 508 and wrapper functions 510, which are described further below with respect to FIG. 5.

3.0 METHODS FOR RECORDING AND REPLAYING A COMPUTER PROGRAM

In this section 3.0, the term "program binary" refers to a binary file containing machine code and libraries for a computer program undergoing test, debugging, or other evaluation.

3.1 Recording a Replay Stream Representing Program Execution 3.1.1 Recording Asynchronous Callbacks According to one embodiment, asynchronous callbacks are recorded and replayed. Callbacks are function calls that the system may make into the application space. In conventional practice, program developers are required to provide a callback handler routine in a program binary for each asynchronous callback that an operating system might send to the program binary. In such cases, the application registers a callback handler with the operating system and specifies an entry the system may use. Example usages of callbacks are system events or notifications, which can be nondeterministic. For example, Microsoft Windows messages and user input events might generate callbacks to the application such as mouse or keyboard events.

Generally, an approach for recording and replaying asynchronous callbacks involves tracking when a callback or exception is made while executing a system call. To perform such tracking, the replay system first intercepts the function calls that register callback handlers. The replay system installs a proxy callback routine so that the system will notify the replay system when a callback occurs and not the application directly. This approach isolates the application from any nondeterministic interaction that can be generated from the system.

Figure 1C:
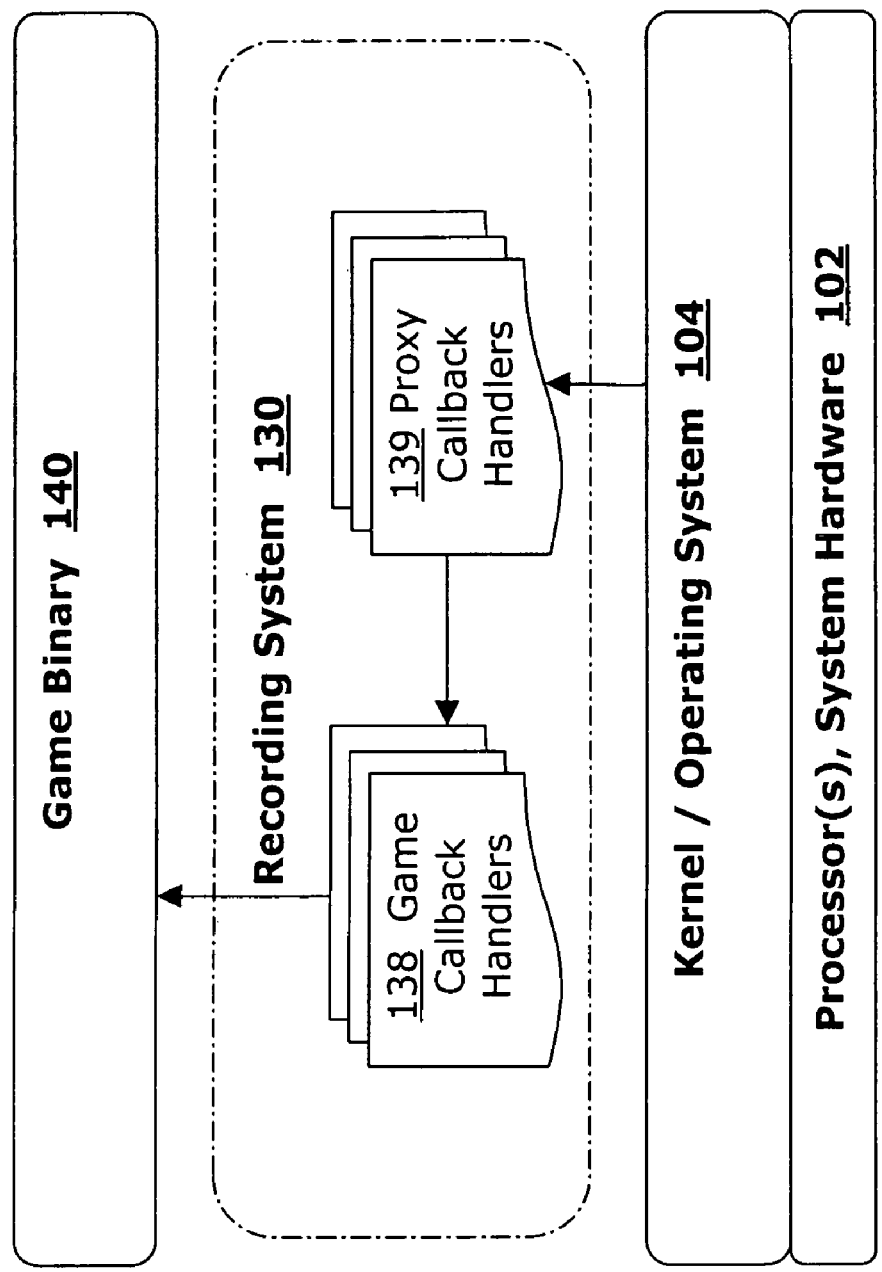
FIG. 1C is a block diagram that illustrates a general approach for recording and replaying asynchronous callbacks in the context of the system of FIG. 1B.

FIG. 1C is a block diagram that illustrates a general approach for recording and replaying asynchronous callbacks in the context of the system of FIG. 1B. In an embodiment, tracking asynchronous callbacks includes detecting that game binary 140 is attempting to register one or more game callback handlers 138 with operating system 104, and registering one or more proxy callback handlers 139 with the operating system as substitutes for the game callback handlers. Such installation may use an instrumentation approach that is described further below, resulting in creating a modified game binary that includes the proxy callback handlers within a proxy space of the game binary.

The proxy callback handlers 139 perform asynchronous callback handling on behalf of the game callback handlers 138. For example, system 104 may call the proxy callback handlers 139 with callback or exception events. The replay system 130 intercepts such calls, records callback information as needed, and then calls the game callback handlers 138 with the same callback and exception events.

The recorded information includes a sync point so that a callback can be replayed at the same point in execution that the callback occurred at the time of recording. Sync points represent an order at which a callback occurred, but not necessarily the absolute time at which a callback occurred. In an embodiment, integer values termed sync index values represent sync points. Index values are described further herein with respect to FIG. 7.

Upon re-execution of the program and playback of a replay stream, asynchronous callback events are queued in the proxy callback handlers 139 for delivery to the game binary 140. The callback events are delivered from the queues at the appropriate recorded sync point. This approach may result in the replay system 130 blocking delivery of events until an appropriate point during execution; however, the use of callback delivery queues guarantees that program replay accurately reproduces an earlier recorded execution session. The callback events are delivered from the proxy callback handlers 139 to the game callback handlers 138 in the game binary 140. Thus, during replay, simulated callback events are delivered to the game binary 140 at specific recorded points. This approach can be applied to message callbacks, sound system callbacks, or any other asynchronous input/output.

As an application makes a system function call, the replay system monitors whether the system makes a callback or multiple callbacks during the function call. The replay system records all nondeterministic data that is passed in during each callback to the application. After the data is recorded, the replay system allows the original callback to be received by the application through the original registered callback handler. This approach allows the application to receive the callbacks, as it would do normally without replay.

Figure 2A:
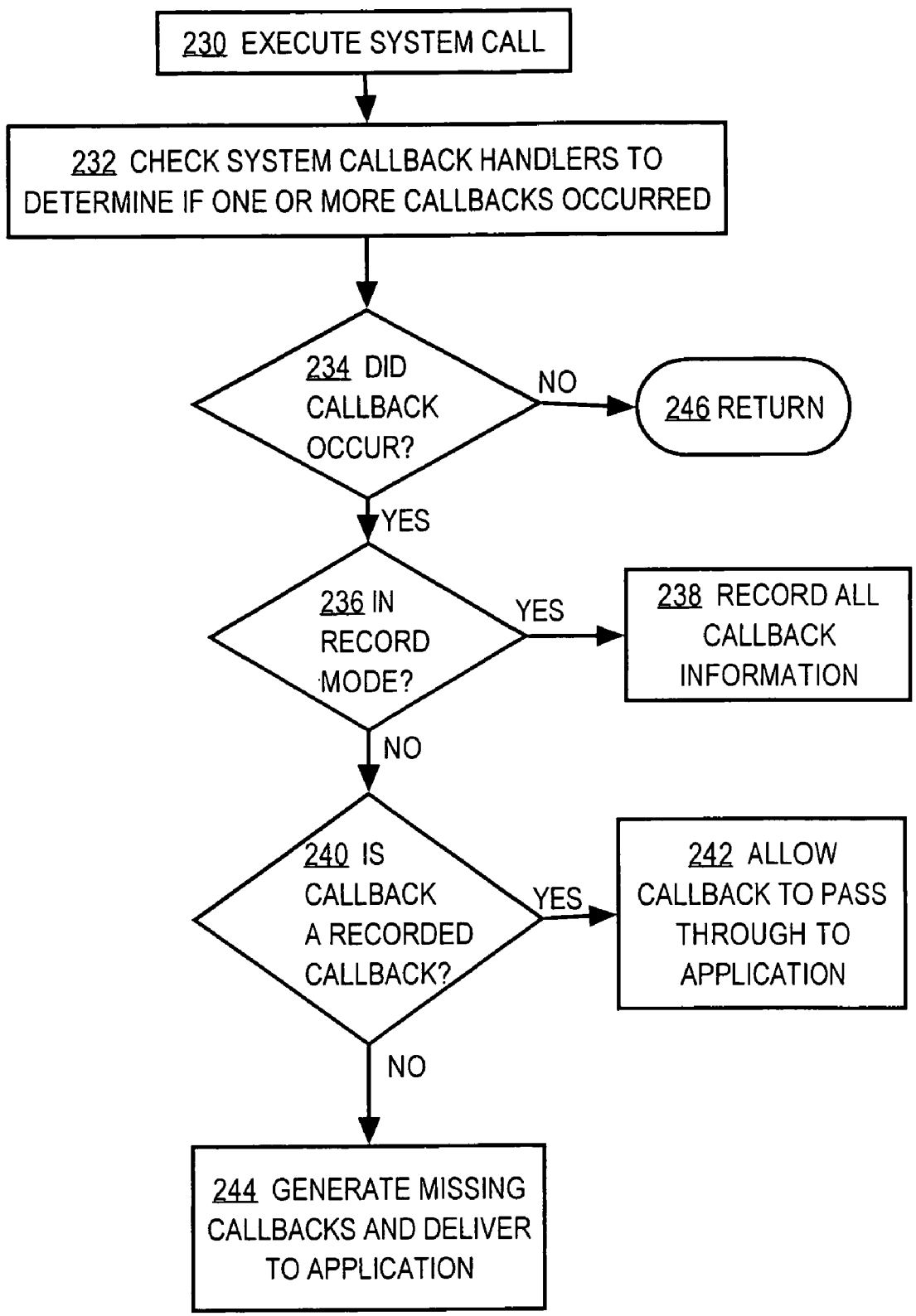
FIG. 2A is a flow diagram illustrating a process of recording and replaying asynchronous callbacks in one embodiment of the foregoing approaches.

FIG. 2A is a flow diagram illustrating a process of recording and replaying asynchronous callbacks in one embodiment of the foregoing approaches.

In step 230, an operating system executes a system call. At step 232, the replay system checks system callback handlers to determine if one or more callbacks occurred. If a callback did not occur, as tested at step 234, then control returns to the replay system for other processing at step 246.

If a callback occurred and the replay system is in record mode, as tested at step 236, then in step 238 all callback information is recorded in a replay stream. If the replay system is not in record mode, then the replay system is in replay mode, and in step 240 the process tests whether the callback is a recorded callback. If so, then in step 242 the replay system allows the callback to pass through to the application. If not, then at step 244 the replay system generates the missing callback and delivers associated output to the application.

As indicated in FIG. 2A, during replay, proxy callbacks are substituted. However, the replay system blocks all callbacks from the system that do not occur at the same time that they occurred during recording. Only callbacks that exactly match the recording are allowed to pass through to the application. For callbacks that do not occur at the same time, the replay system simulates a callback using the recorded non-deterministic. This approach allows the application to receive the exact same callbacks as when recorded.

Notably, replay system 130 can determine whether an asynchronous callback from the system has occurred only when the application calls a non-deterministic system API call such that the replay system acquires control of execution and can make the appropriate decision. When the application is executing instructions other than non-deterministic system calls, the replay system 130 does not affect application execution.

3.1.2 Recording Exceptions

Exceptions are another form of flow control that an operating system may send to an application when a function call is made. Exceptions can be nondeterministic. According to an embodiment, replay system 130 processes exceptions in a similar manner as callbacks. In one embodiment, replay system 130 installs an exception handler for each application function that the replay system intercepts and that makes a function call into the operating system. The exception handler monitors whether an exception is thrown. In record mode, any exception is recorded, and multiple exceptions may be recorded. Once the nondeterministic data is recorded, which often includes all the exception information, the exception is passed on to allow the application to handle the exception normally.

Figure 2B:
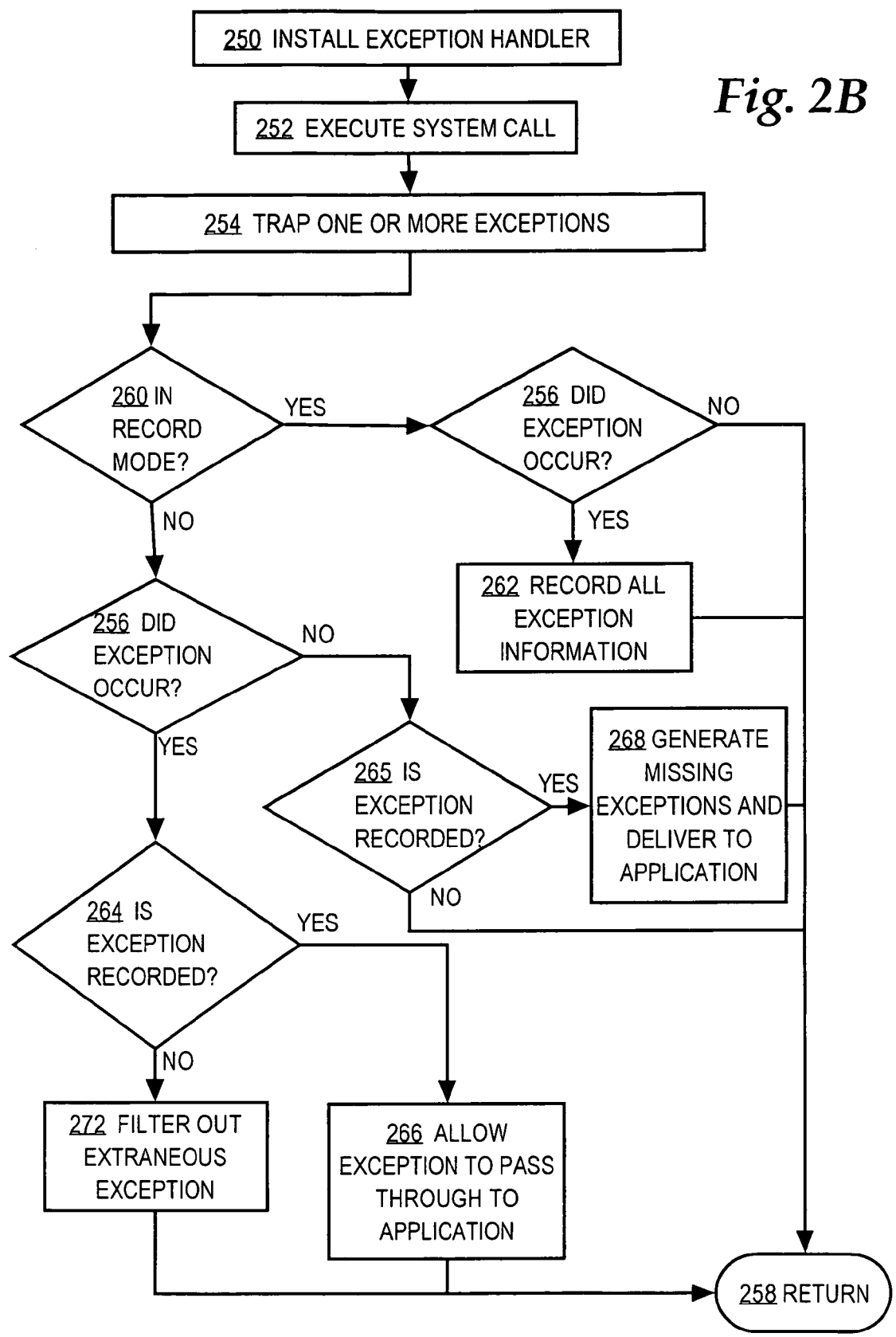
FIG. 2B is a flow diagram illustrating a process of recording and replaying exceptions in one embodiment of the foregoing approaches.

FIG. 2B is a flow diagram illustrating a process of recording and replaying exceptions in one embodiment of the foregoing approaches. In step 250, an exception handler is installed. Step 250 may occur at runtime during either recording or replaying an application. In step 252, a system call is executed. At step 254, one or more exceptions are trapped.

At step 260, a test is performed to determine if the replay system is in record mode. If so, then at step 256, a test is performed to determine if an exception occurred during execution of the system call at step 252. If not, then control returns at step 258. If an exception occurred, then all exception information is recorded in the replay stream at step 262, and control returns at step 258.

If the replay system is in replay mode, then control passes from step 260 to step 256 in which a test is performed to determine if an exception occurred during execution of the system call at step 252. If the exception occurred during replay but was not recorded, as tested at step 265, then in step 268 the missing exception is generated and delivered to the application.

If an exception did occur at step 256 and if the one or more exceptions have been recorded, as tested at step 264, then in step 266 the replay system allows the exceptions to pass through to the application. If an exception occurred at step 256 but no exception is recorded at that point, as tested at step 264, then in step 272 the replay system filters out the extraneous exception and does not pass the exception through.

Thus, during replay, the replay system monitors if the same exact exception is thrown during a function call. If an exception is not thrown, then the replay system can generate a simulated exception using the recorded data from earlier. If an exception is thrown during replay when an exception did not occur on record, the extraneous exception is filtered out and not allowed to pass to the application. Using these techniques, the application will receive the same exception behavior as it did on record.

In one embodiment, some data that the replay system 130 must generate during replay originally contained contextual data during record that was relevant to the application when it was recorded, but will be out of context during replay. For example, exception information may contain memory addresses or window handles that will be different during replay. For these cases, replay system 130 substitutes the original data that was contextual with data that is relevant to the application during replay. To perform such substitution, replay system 130 maps certain memory addresses, window handles, and pointers to other data from what they were during record, to what they are during replay. For example, during record, an application may create a window and the operating system assigns the window a window handle of value 0×5. However, during replay, when the application creates the window, the OS may assign a window handle of value 0×8. Therefore, replay system 130 stores the values and changes 0×5 to 0×8 when appropriate during replay.

3.1.3 Recording Thread Context Switches

According to one embodiment, thread context switches occurring during program execution are recorded and replayed. In this description, "thread context switch" refers to an operation of a data processor when the processor changes attention from one executing program thread to another thread. The order of thread context switching can be important, for example, when data is exchanged between threads. In one embodiment, only thread context switches associated with data exchanges are recorded and replayed. This constraint has been found appropriate because recording all thread context switches would consume an impractical amount of memory.

One embodiment involves identifying methods that are called to share data between threads, and recording only information about the called methods and the sync point at which such calls occurred. Methods that are called to exchange data between threads are termed thread sync points herein. Thread sync points have been found to occur only when an application calls an operating system function that performs resource locking. Thus, examples of thread sync points include methods that result in an operating system locking certain resources, such as Lock, TryLock, and Release methods; methods associated with waiting on or signaling program events, such as Event Wait, EventSignal, WaitForMultipleEvents, WaitForSingleObject; and methods that signal entering or exiting critical sections of executable code, such as EnterCriticalSection and LeaveCriticalSection.

Recording such method calls and associated thread sync points ensures that such methods are called in the same order upon replay. Therefore, an embodiment can ensure that a program binary processes data in the same way upon replay as the data was processed at the time of recording. In particular, the program binary has access to the same resource at the same sequence point, and therefore in the same resource state, at replay as upon recording.

Figure 2C:
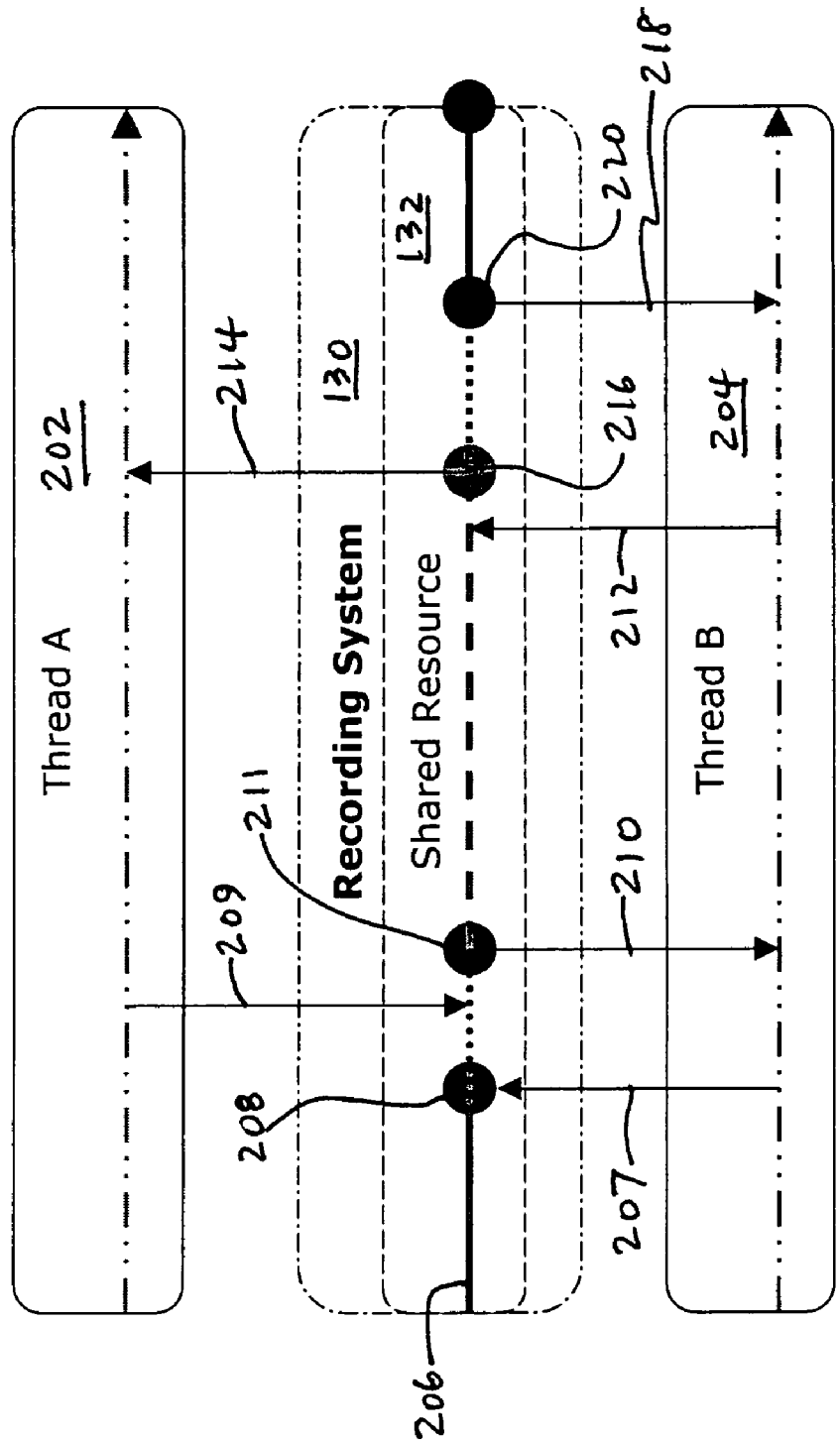
FIG. 2C is a block diagram illustrating how thread context switches are recorded.

FIG. 2C is a block diagram illustrating how thread context switches are recorded. A replay system 130 monitors accesses of a first thread 202 and a second thread 204 to a shared resource 132. Line 206 represents a progression of time from left to right in FIG. 2C.

The second thread 204 issues a resource request 207 and obtains a lock or control of resource 132 at a first sync point 208, which replay system 130 records. First thread 202 then issues a resource request 209 to acquire a lock for the same resource. Although resource request 209 may require a processor to switch context from second thread 204 to first thread 202, any such switch is necessarily temporary because the processor cannot give control of the resource 132 to the first thread when the second thread is holding control. The processor places the first thread 202 in a queue identifying threads that want the resource. Therefore, replay system 130 does not record a context switch at the time of request 209.

Second thread 204 then issues a resource release 210 for the shared resource 132, allowing the processor to dequeue first thread 202 and give the first thread control. Therefore, replay system 130 records a second sync point 211 reflecting a change in control of the resource 132. Second thread 204 later issues a resource request 212 for the resource 132, but the processor cannot grant control of the resource to the second thread. Therefore, recording system does not record a context switch at that point.

First thread 202 issues a resource release 214, and in response the replay system 130 records a context switch at a third sync point 216, because second thread 204 gains control of the resource. Second thread 204 issues a resource release 218 at a fourth sync point 220, which is recorded.

Figure 10:
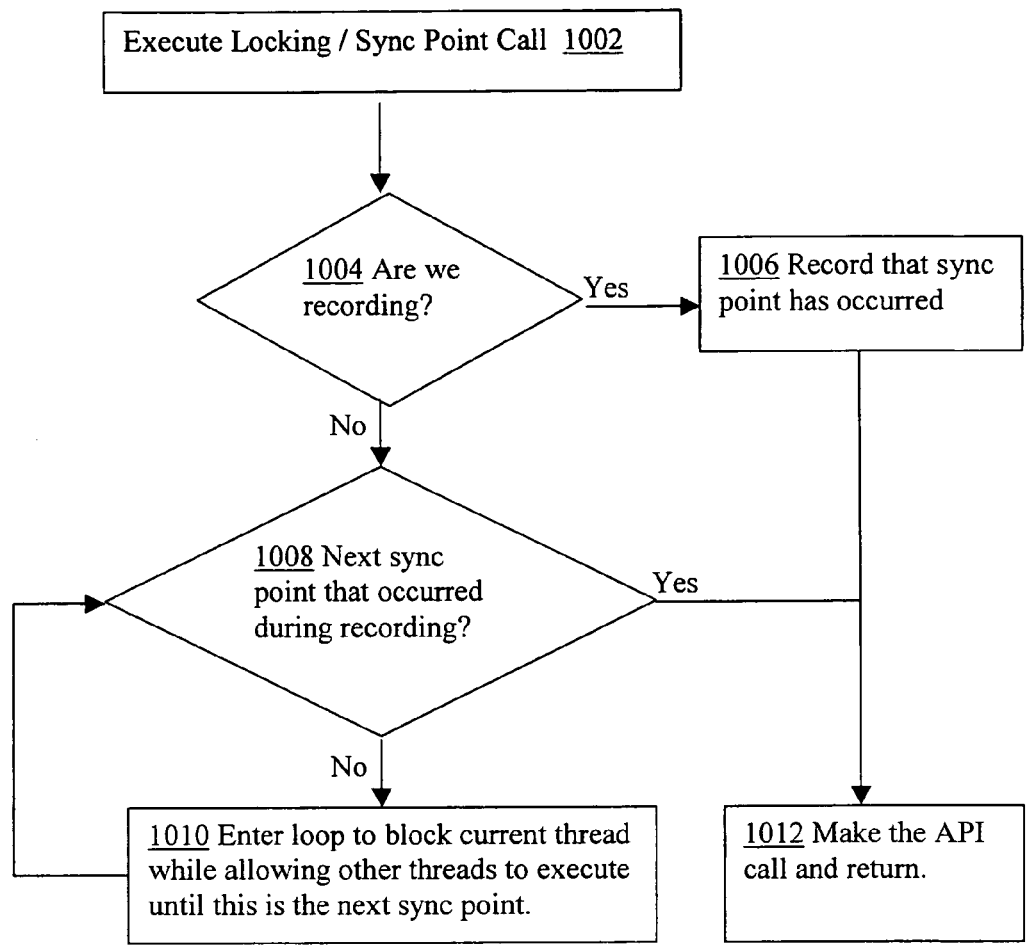
FIG. 10 is a flow diagram of a method of processing program calls that relate to thread context switching.

In one embodiment, during replay, the replay system 130 monitors application execution and intercepts each application call to an operating system function that involves resource locking or release. FIG. 10 is a flow diagram of a method of processing program calls that relate to thread context switching. In step 1002, a program binary attempts to execute a resource locking or other call at a sync point. Replay system 130 intercepts the call. If recording is occurring, as tested at step 1004, then in step 1006 the current sync point is recorded, and at step 1012 the replay system makes the operating system API call on behalf of the program binary. If recording is not occurring, then control transfers to step 1008, which tests whether the next sync point that occurred during recording has arrived. If the next sync point has arrived, then in step 1012 the OS API call is made. If not, then in step 1010 a loop is entered that blocks the current thread while allowing other threads to execute until the next recorded sync point occurs.

Thus, replay system 130 determines the then-current sync point at which such a call occurred, and compares the current sync point to a replay sync point for the next call represented in the recorded replay stream data. If a match occurs, then the replay system 130 allows the call to pass through to the operating system. If no match occurs, replay system 130 blocks the call and enqueues the call in a waiting queue until the correct sync point arrives. A call is allowed to proceed only at the correct sequence point. This approach ensures that a particular thread only receives a lock on a resource at the same order in execution on replay that the thread received the lock when execution was recorded.

Notably, replay system 130 can determine whether a resource lock or release should occur only when the application calls a non-deterministic system API call such that the replay system acquires control of execution and can make the appropriate decision. When the application is executing instructions other than non-deterministic system calls, the replay system 130 does not affect application execution.

Thus, the approach herein focuses on recording a sequence of resource locks that occur for a shared resource, rather than the particular time at which locks and releases occurred. By recording information about lock methods and releases, and the sequential sync points at which locks and releases occurred, replay system 130 can accurately replay the order of program execution.

3.1.4 Shared Memory Access

According to one embodiment, accesses of application processes to shared memory are monitored using a recording system API. Thus, developers who are preparing source code of programs under test include calls to an API associated with replay system 130 whenever access to shared memory is needed. Adding the API calls to program source enables replay system 130 to monitor shared memory accesses at runtime when a program binary based on the program source is compiled and run.

3.1.5 Memory Management

In one embodiment, replay system 130 includes mechanisms for accurately replicating the contents of main memory of a hardware system on which the program binary runs when execution is recorded and replayed. Accurate memory replication provides accurate reproduction of memory leaks, for example, if memory leaks exist as a result of program operation. Accessing un-initialized memory may result in very non-deterministic behavior from an application. The application may crash, or make logic decisions based on bad data. Reproducing this behavior is difficult because the state of un-initialized memory is non-deterministic. Further, in the context of developing game system, accurate memory replication enables replay system 130 to reproduce any code that has data sorted by pointers. Typically, in game systems a game engine's main loop involves iterating over game objects that are sorted by their memory address.

In an embodiment, replay system 130 establishes a private, controlled memory heap that is used to satisfy all requests for memory allocation that the program binary issues. Replay system 130 intercepts all memory requests that the program binary issues to the operating system, and redirects such requests to the private memory heap. Examples of memory request operations include HeapAlloc, VirtualAlloc, etc. The foregoing approach isolates memory requests and prevents non-deterministic system calls from making memory allocations "under the hood" or without information the program binary.

Further, in an embodiment, replay system 130 tracks all memory allocation requests that an operating system or hardware platform requests a program binary to issue during execution. For example, in the context of game development, certain game console systems may request a program binary to provide and manage memory. A specific example is the XMemAlloc call on the Microsoft XBOX platform. Replay system 130 records information identifying all such requests as part of a replay stream, and upon replay, the recording system simulates such requests. The requests are satisfied using a dummy memory heap, but processing such requests insures that the game heap is preserved.

3.1.6 Efficient Storage of Replay Data

In one embodiment, replay system 130 implements mechanisms providing efficient storage of replay data representing an execution session of a program binary. According to a first mechanism, only non-deterministic function calls are recorded. Most function calls that a program binary issues are deterministic in nature, and there is no need to record them, because issuing the same calls at replay time necessarily causes the same result in program output or state change.

According to another mechanism, program binaries that issue a rapid succession of clock sampling calls are subject to sample throttling upon recording. In sample throttling, replay system 130 records only a specified maximum number of clock sampling calls within a particular time interval, rather than the actual number of such calls that the application issues. This approach appropriately reduces the number of clock sampling calls in a replay recording, based on the recognition that there is often no need for a program binary to access a time value more than a few times per second or, in the context of game development, each time the video buffer is drawn to the screen (e.g., each frame). Additionally or alternatively, sample throttling is activated only in response to specified user input or in response to a configuration command. Therefore, for certain purposes sample throttling can be turned off. High-performance profiling is an example application in which turning off sample throttling may be beneficial.

As another efficiency mechanism, in an embodiment, replay system 130 buffers replay data as the data recorded using a replay data buffer 134 (FIG. 1A), and flushes the replay data buffer to persistent storage 136 only when necessary. Replay data buffer 134 is maintained in main memory of the platform that is running the program binary, and persistent storage 136 is any non-volatile storage media such as disk, flash memory, etc.

In one embodiment, replay system 130 buffers replay data in replay data buffer 134, and flushes the replay data buffer to persistent storage 136 in response to expiration of a periodic timer or in response to a critical event. For example, exceptions or an exit of the program binary may trigger flushing replay data to persistent storage. In an embodiment, the instrumentation step of FIG. 1A involves installing one or more exception handlers or filters of replay system 130 that intercept exceptions and exit events into the program binary. Thus, when a program crash, bug, or other exception arises, replay system 130 is notified and can respond by flushing the contents of a replay data buffer to disk. This approach ensures that replay data is stored when the replay system 130 is used to test an unstable application.

A replay system 130 that implements such efficiency approaches has been found to generate replay data of about 300 kilobytes per minute of program binary execution for a game program. Network-based game programs with simultaneous players may generate more storage. The amount of replay data generated and stored may vary from program to program.

Because replay data is generated efficiently and the resulting replay data files are small, after recording, replay data may be stored using a document control system or code control system that requires checking data in and out as a control measure; replay data can be stored in such a system with a bug report, for the purpose of communicating bugs among developers and quality assurance personnel.

3.2 Replaying a Replay Stream

3.2.1 Replaying on Different Machines

The approaches herein recognize that a recording of program execution is associated with a hardware configuration of a platform that is running a program under test, and that replaying the recording on different hardware may cause inaccurate replay or errors. For example, a recording that includes non-deterministic input from a particular hardware device may be non-reproducible when a user attempts to play back the recording on another system that does not have that hardware device. Therefore, the approaches herein provide a way to account for hardware configuration differences when a recording is replayed on a different machine. The approaches herein also provide ways for synchronizing information describing hardware assets and source code versions in a dynamic, ongoing development environment.

Figure 3:
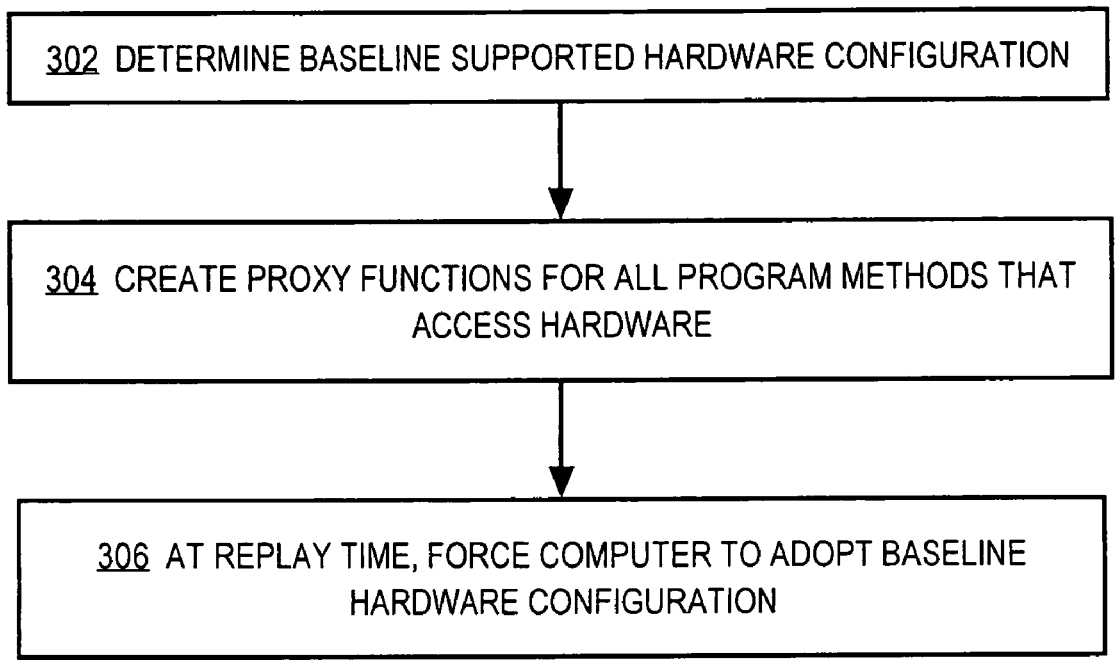
FIG. 3 is a flow diagram of a method for replaying, on a computer having a first hardware configuration, a recording of program execution that was made on a computer having a second hardware configuration.

FIG. 3 is a flow diagram of a method for replaying, on a computer having a first hardware configuration, a recording of program execution that was made on a computer having a second hardware configuration. In step 302, a baseline hardware configuration is determined. For example, a program developer determines a minimum hardware configuration that a particular program under test can support while adequately testing or debugging features of the program.

In step 304, proxy functions are created in the replay system 130. Each of the proxy functions is associated with a program method that accesses or queries a particular specialized hardware feature not found in the baseline platform. For example, one proxy function might intercept program accesses to a graphics-processing unit or to a sound processor that is not part of the baseline configuration.

Upon playback, the proxy function supplies a graceful response to a query to that hardware feature. Thus, in step 306, when a recording is replayed, the program under test is forced to use the baseline hardware configuration that was established in step 302, by interacting with the proxy functions rather than the actual hardware elements that are not available in the baseline hardware configuration. Therefore, a program execution session that was recorded on one machine can be replayed on another, different machine having a different hardware configuration.

In an embodiment, step 306 is optional and is activated in response to a user activating a specified configuration option.

In another embodiment, when a program execution session is recorded, the recording is stored with information identifying changeable assets that the session accessed and version information for the program and for the assets. Examples of changeable assets include data files, configuration files, graphics files, sound files, and other elements that a user or program could modify independent of modifying the program binary.

In an embodiment, the instrumentation step of FIG. 1A installs one or more file I/O proxy functions that intercept and record accesses to the file assets, record what file was accessed, record a version value associated with the file, etc. Using this approach, a complete audit trail is maintained of changeable assets that were used in generating a particular recording.

When the same recording is replayed later, the changeable assets or code are loaded into memory so that they are available for interaction with the program execution session as it is replayed. If a particular asset is not available, not the same version, or otherwise changed at the time of replay as compared to the state of the asset at recording, then replay system 130 issues a warning message or throws an error so that the user is informed that replay execution may not accurately reproduce the same execution session as at recording. In an embodiment, an asset that was accessed from local disk at the time of recording can be accessed from a network location at replay time.

The preceding approach may be implemented using a storage and retrieval module 132 (FIG. 1A) that is integrated into or accessible to replay system 130. Information about accessed assets may be stored on a local machine, local network storage, remote storage, etc.

In an alternative embodiment, a copy of the actual changeable assets is recorded in association with a replay data stream. However, this alternative requires considerably more storage. This alternative may be implemented by receiving user input specifying an execution option for replay system 130, such as in a configuration file, with which a user may specify one or more content files or other assets that are actually recorded as part of the replay data stream.

3.2.2 Fast Forwarding and Skipping State

In an embodiment, upon replay, any program execution function that does not affect the internal state of a program binary can be skipped, for example, in response to user input requesting a skip function or in response to selection of a particular user input device. Examples of program execution functions that do not affect state include any function that provides only output. In the context of a program binary that provides a game, the operation of video screen drawing functions can be skipped. Thus, a user can elect to skip program execution that only involves drawing a complicated video image or series of images. This may enable the user to save a substantial amount of time in replaying a long execution recording.

In an embodiment, a user can skip ahead to a particular point in an execution session by providing user input indicating a request to skip ahead. For example, in one embodiment, replay system 130 periodically stores checkpoint data representing values of all program state values at a particular instant in time and all system state values at the same instant. The checkpoint data essentially represents a snapshot of application state at a particular point in time, and is stored in the replay data stream with information indicating the sync point or time associated with the state. State information may be stored as part of a replay stream or independently. In an embodiment, such periodic checkpointing occurs at regular specified intervals in a recording session, e.g., every five (5) seconds. Any specified interval period may be used.

In one embodiment, the state checkpoint data is created and stored after a complete application execution session has been recorded and replay stream data has been stored. Thus, replay system 130 may replay, scan or review an existing set of replay stream data and create and store state checkpoint data based on determining how values change upon replay. This approach has the advantage of not interrupting application recording to perform the time-consuming step of creating and storing the state checkpoint data. Alternatively, replay system 130 can create and store state checkpoint data during recording a program execution session.

Thereafter, at the time of replaying a recording, a user can provide user input indicating a request to skip to the next state checkpoint or sync point. In response, replay system 130 determines which checkpoint is next, loads all state values for the program binary and the hardware system, sets the state values in the program binary and hardware system under test, and commences continued program execution. In a game system, the user experiences a sudden jump ahead in program execution and the appearance of the video display.

Functions for capturing application state and moving to a particular application sync point or time may be implemented an API that an application can access. State checkpoint data may be stored in a replay state file comprising a plurality of type-value pairs that represent program or system variable types and associated values.

3.2.3 Replaying Data Values Read from Non-Initialized Memory

When an application initiates operation, the state of main memory is often unknown. For example, unless the application or an operating system implements some form of memory initialization that sets all memory locations to a particular value, the application cannot assume that memory contains any particular value. According to an embodiment, replay system 130 can replay data values that are accessed from memory having an unknown state at program startup.

Generally, an application must request an allocation of memory that it needs to read or write from a system kernel that implements protected memory. The amount of memory may be large, spanning gigabytes or beyond terabytes. Therefore, recording the contents of such data, as the contents existed at the time of an application execution session, is impractical. In an embodiment, replay system 130 intercepts all such requests. Each time a new address space is first requested, the replay system initializes values in the address space to deterministic values using pseudo-random value generation before allowing the application access to the memory. Later, upon playback, before responding to an address space request, the replay system initializes the requested memory with the same values.

In another embodiment, replay system 130 can simulate a startup system state in which memory contains random, non-initialized data. Such simulation is useful to prevent the replay system 130 from introducing changes in system condition that could affect program execution or performance. Thus, such simulation prevents the replay system 130 from masking problems that may exist when the replay system is not installed or used. Further, the amount of data required to generate the same memory pattern is small, so that recorded replay stream files remain small. Having to record a gigabyte of data from non-initialized memory to replay a requested gigabyte of data is not considered practical in many cases.

Figure 6:
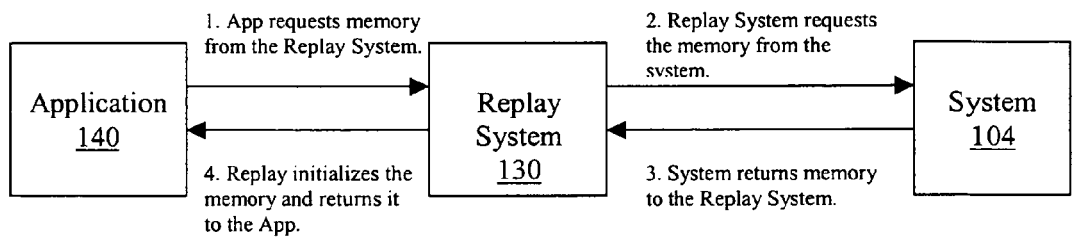
FIG. 6 is a block diagram of an approach for processing application requests for values from non-initialized memory.

FIG. 6 is a block diagram of an approach for processing application requests for values from non-initialized memory. At step 1 of FIG. 6, an application 140 requests values from memory from replay system 130. The replay system 130 intercepts the request, and at step 2 the replay system requests the same memory values from the system 104. The system 104 returns the contents of the requested memory to the replay system 130 at step 3. At step 4, the replay system 130 initializes the memory and returns the memory contents to the application.

According to an embodiment, replay system 130 uses a random seed value and pseudo-random function at step 4 of FIG. 6 to generate an unlimited amount of reproducible simulated memory values. Common program values, such as all unset and set on integer values, are simulated in this approach, and other random values may be simulated. For example, a 32-bit random seed may be generated and recorded as part of the replay stream file. At replay time, the recorded random seed value is retrieved and fed as input to a deterministic pseudo-random function.

The function may be used to generate gigabytes of pseudo-random data that is consistently reproducible whenever the replay stream file is replayed. Because the pseudo-random function is deterministic, the output data is consistent from record to replay. Further, the output data also provides a good approximation of a set of non-initialized data. Moreover, the recorded replay stream file needs to contain only the seed value, not the entire set of generated data; as a result, the technique herein is highly efficient in terms of storage.

In one embodiment, the pseudo-random number generator as defined in a standard operating system library is used to select a random sequence of values that are weighted appropriately.

In another embodiment, each address value is initialized only once. If an application requests the same address value, and then later frees and requests it again, the replay system does not have to reinitialize the address value, since the application will have left the address in a deterministic state.

In one approach, two variables in the replay system track the lowest and highest address values that the application has requested. Each time the application issues a request that is less than the lowest value or greater than the highest value, the variables are updated accordingly. When a memory request is made for an address that lies completely inside the two variables, no new initialization is needed, and the replay system performs no further interaction with the requested memory.

3.3 Example Replay Stream Data Format

Figure 7:
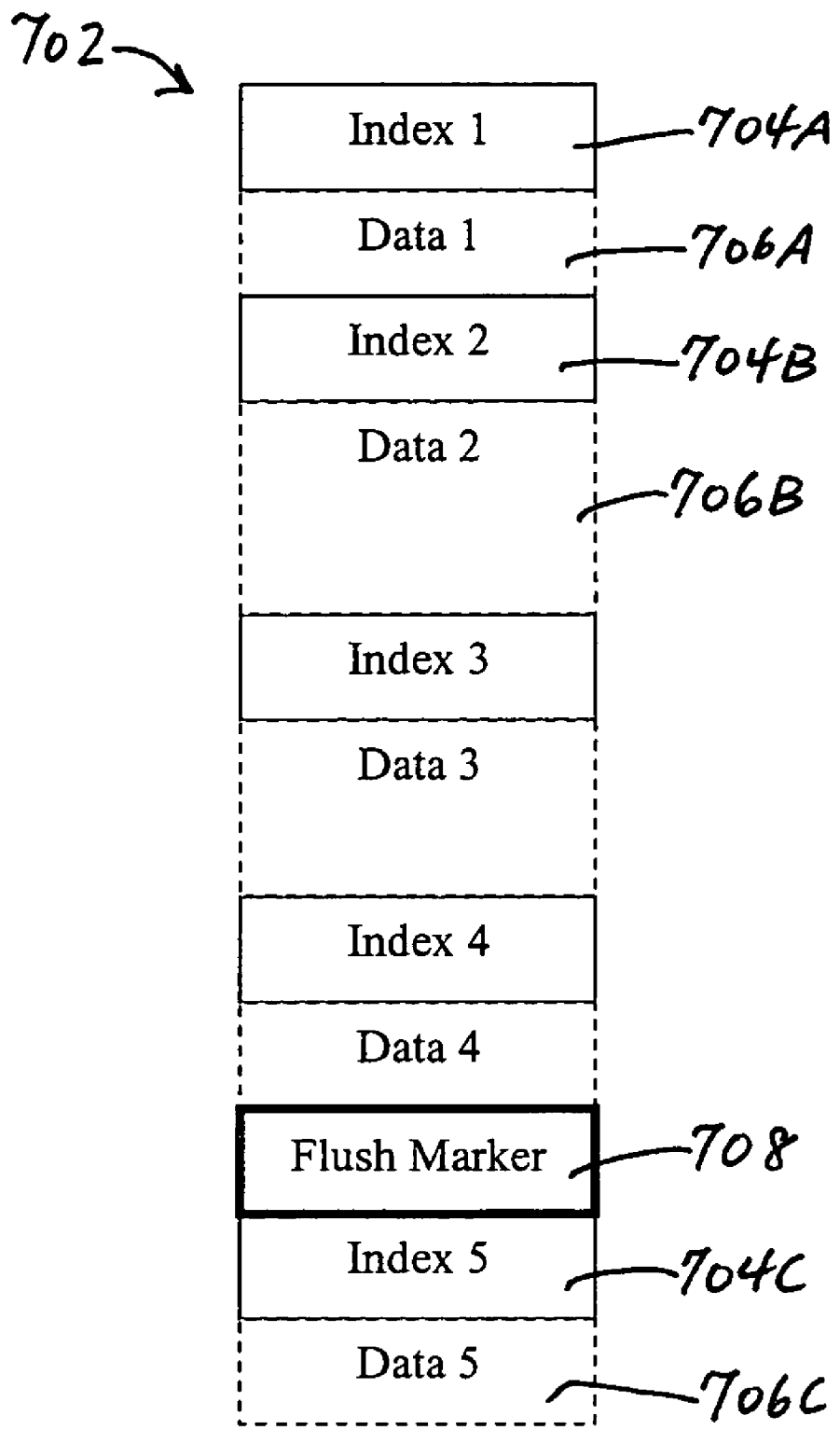
FIG. 7 is a block diagram of an example data format that can be used for storing replay data that is generated as part of recording program execution using the foregoing techniques.

FIG. 7 is a block diagram of an example data format that can be used for storing replay data that is generated as part of recording program execution using the foregoing techniques. In one embodiment, a replay data stream 702 or replay stream file comprises a plurality of index elements 704A, 704B, 704C, etc., a plurality of data elements 706A, 706B, 706C, etc., each corresponding to an index element, and one or more flush marker elements 708.

In an embodiment, index elements 704A, 704B, 704C, etc., and flush marker elements 708 are fixed size. Each of the data elements 706A, 706B, 706C, etc., is variable in size. Each of the index elements 704A, 704B, 704C relates to the sequence of nondeterministic data that is recorded in the stream. Each data element 706A, 706B, 706C has a unique index 704A, 704B, 704C associated with it. Index elements 704A, 704B, 704C typically are sequenced and carry values that increment by one linearly for each data element 706A, 706B, 706C that is recorded. The index elements 704A, 704B, 704C are used during replay mode for verification that an application is executing in the same fashion as it did during Record mode.

Each data element 706A, 706B, 706C relates to a nondeterministic event that occurred during recording. During record mode, data in a data element is collected and written to the replay data stream 702 with an index value. During replay mode, a data element is read from the replay data stream 702 and the data element provides the output of a nondeterministic event back to an application.

The flush marker element 708 indicates a point at which information was written to the replay data stream 702. The flush marker element 708 is used for verification that program execution is the same during replay mode as it was during record mode.

3.4 Approaches for Applying Instrumentation Code to Program Binaries

Generally, applying instrumentation code to a program binary involves changing instructions in the program binary by moving the instructions or redirecting certain instructions to other locations. Some instrumentation may involve modifying relocation tables or segment headers. Instructions are disassembled and instructions associated with non-deterministic input or events are recognized and modified.

Techniques for replacing assembly instructions in-place within an application are now described. In general, replacing assembly instructions as party instrumentation involves how to replace a specific binary instruction while preserving the position and order of all the code surrounding the replaced instruction.

Figure 4A:
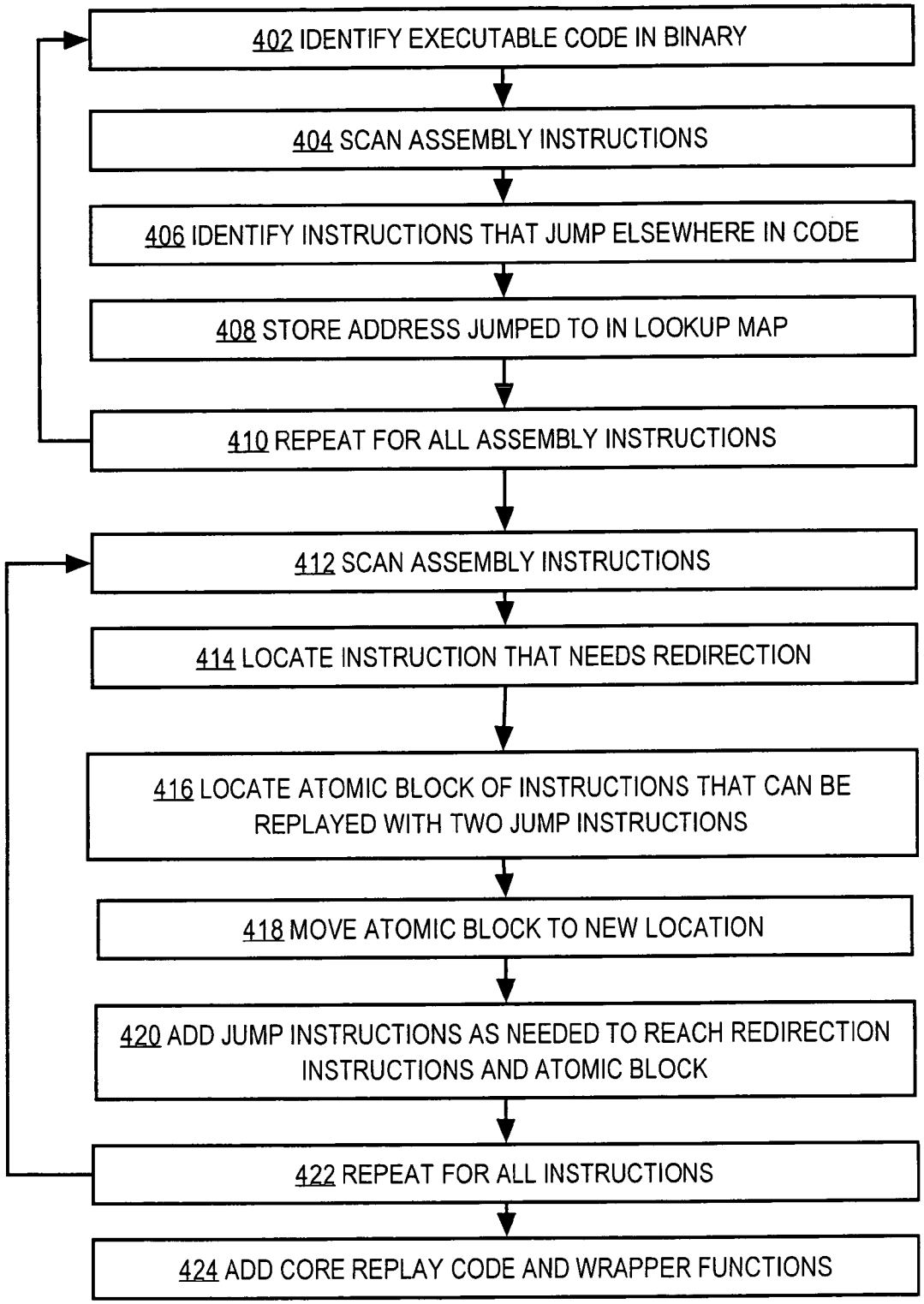
FIG. 4A is a flow diagram of a process of adding replay redirection instrumentation to binary code.

FIG. 4A is a flow diagram of a process of adding replay redirection instrumentation to binary code. In step 402, the executable code in the binary file is identified. A binary file comprises one or more sections, each comprising executable code, data or both. Code comprises binary instructions, which can be disassembled into assembly instructions. Generally, binary instructions in the binary file correspond one-to-one assembly instructions. Disassembly results in generating a view of the binary file as a linear list of assembly instructions, which may include any instruction that a particular processor can execute. Examples of assembly instructions include MOV, JMP, ADD, etc.

Binary files prepared for different hardware and software platforms may conform to different binary file formats. The description herein assumes that the file format of a particular binary file is known and that a developer has available a software tool that locates and identifies the sections in the binary that contain executable code rather than data. When the executable code has been identified, two passes can be used to introduce redirections in the code that are used as part of the replay system.

Step 404 to step 410, inclusive, represent a first pass that iterates over each assembly instruction looking for instructions that jump into different areas of other code. On a binary file containing instructions conforming to the Intel x86 instruction set, pertinent jump instructions include unconditional jumps and conditional jumps. Each address that is jumped to is stored in a lookup map, which will be used later during a second pass.

In step 404, assembly instructions are scanned. In step 406, the process identifies instructions that jump elsewhere in the code, such as conditional or unconditional jumps. In step 408, each address that is jumped to is stored in a lookup table for later use. In step 410, the process repeats steps 404-408 for all other assembly instructions that are found in the binary file.

Step 412 to step 422 inclusive represent a second pass over the binary file. In step 412, each assembly instruction in the binary file is scanned. In step 414, the process locates an instruction that needs redirection; instructions that do not need redirection are skipped. In one embodiment, instructions that have nondeterministic outputs are selected for redirection into the replay system so that the replay system can record the outputs in record mode, and set the outputs in replay mode. As a specific example, the RDTSC instruction on the x86 processor sets the EAX and EDX registers to nondeterministic values. The replay system can record the values of the EAX and EDX registers and replay the values of the registers when appropriate.

In step 416, the process locates an atomic block of instructions that the replay system can replay with two jump instructions. In this context, an atomic block of instructions is a linear set of instructions that are always executed together in the same order. No other instructions jump into the middle of atomic block, or jump out of an atomic block. An atomic block can be moved to a different address space without causing execution problems or side effects that may change the nature of the program. When looking for a candidate atomic block, the jump lookup table that was constructed in the first pass (e.g., step 408) is used to ensure that no other instructions are jumping into the atomic block.

Figure 4B:
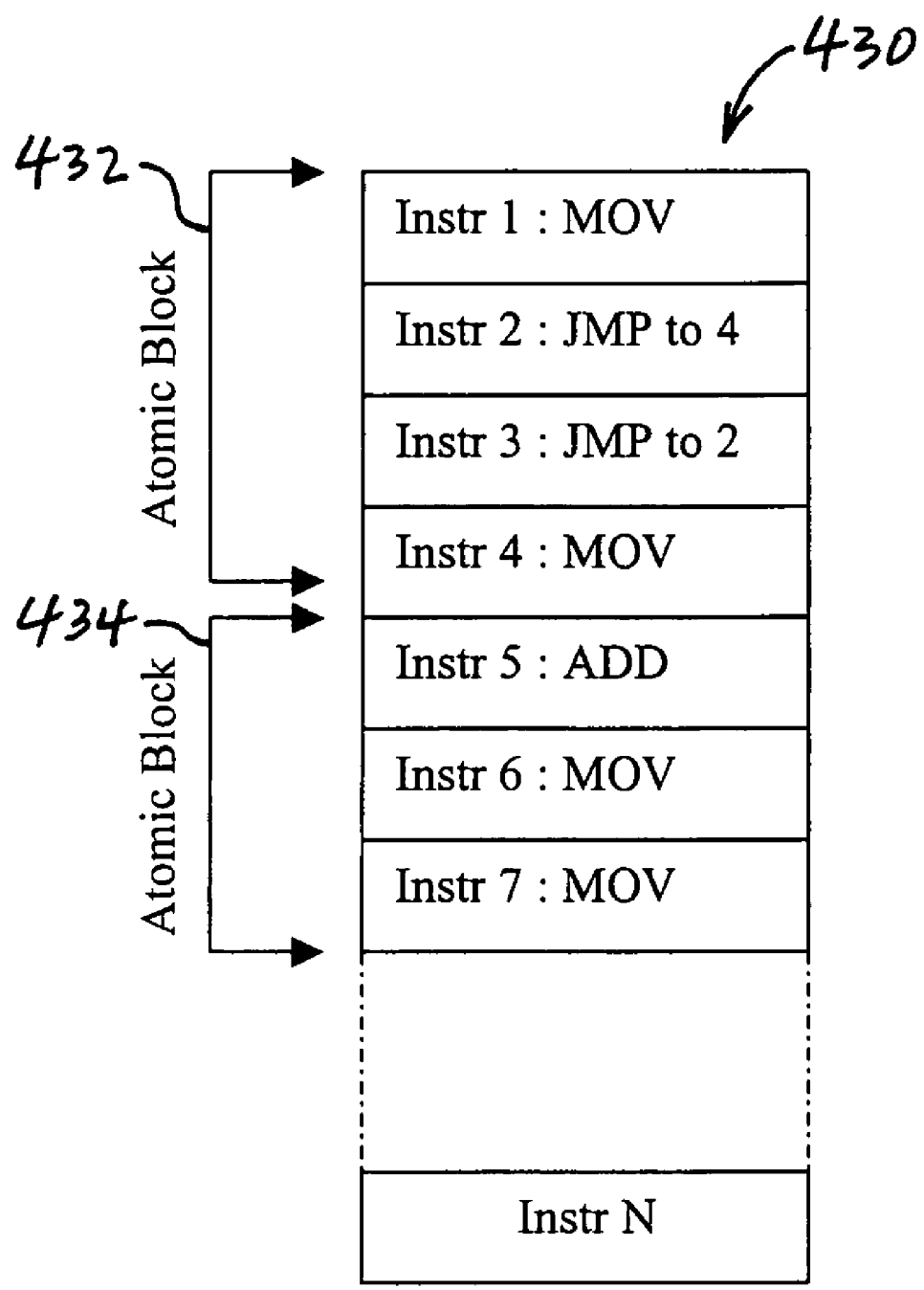
FIG. 4B is a block diagram that illustrates identifying atomic blocks.

FIG. 4B is a block diagram that illustrates identifying atomic blocks. A code segment 430 comprises a plurality of machine instructions denoted Instr 1 through Instr N. A first atomic block 432 comprises instructions Instr 1 through Instr 4, and is considered an atomic block because it contains no jump instructions that jump outside the block, and no other instruction jumps into the atomic block. Similarly, a second block 434 is an atomic block.

In step 416, the atomic block is moved to a new location so that redirection code can be substituted in the binary file at the original location of the atomic block. In an embodiment, an atomic block must be reachable by a small jump statement having a size equal to or less than the size of the instruction that needs to be replaced and redirected.

For example, if the instruction to be replaced and redirected is a two-byte instruction, then that instruction can be moved a maximum of 128 bytes forward or backwards in the code. In that case, at step 414 the process scans the code in both directions and finds the first available atomic block that is reachable and large enough to hold two large jump statements. Two large jump statements are needed to jump into a proxy space associated with the redirection system, because the proxy space may be much further away in the instruction space than 128 bytes. A small jump instruction cannot be used since there might not be enough room to add proxy code.

At step 418, additional jump instructions are introduced into the code as needed to reach new code in a proxy space and to reach the atomic block that was moved at step 416. At step 420, new code is added in the proxy space to redirect nondeterministic functions or output to the replay system.

Figure 4C:
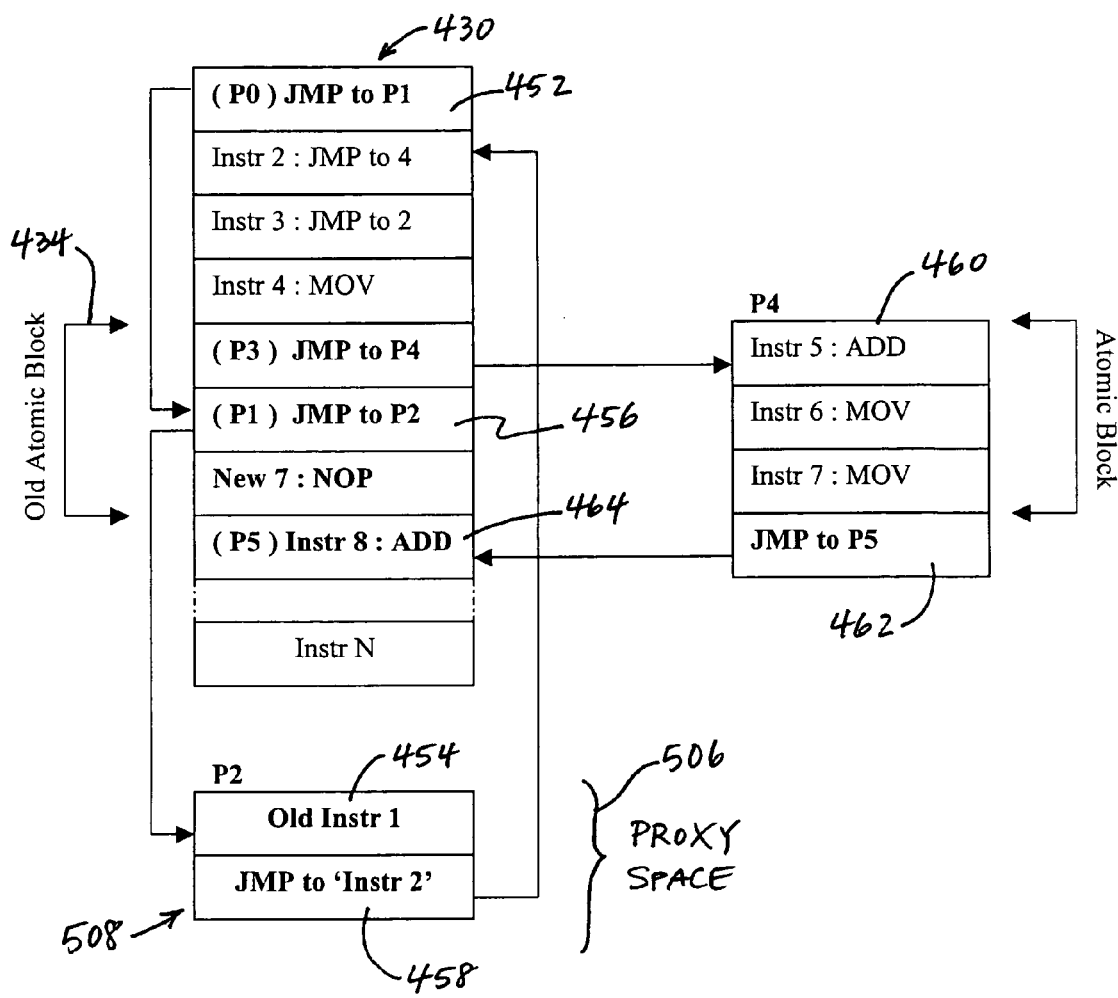
FIG. 4C is a block diagram that illustrates moving an atomic block and inserting redirection code.

FIG. 4C is a block diagram that illustrates moving an atomic block and inserting redirection code. Assume that step 414 of FIG. 4A determines that the instruction Instr 1 of FIG. 4B requires redirection and therefore needs to be moved. Instr 1 is moved to instruction location 454 within a proxy space. A substitute jump instruction P0 replaces Instr 1 at its former location 452 in code segment 430. Instruction P0 provides a jump of 128 bytes or less to instruction P1 at location 456. Execution of P0 causes a processor to transfer control to P1. Instruction P1 is a large jump instruction that can jump into the new replaced code at location 454 in proxy space. The proxy space may contain any amount of code that is necessary for the replay system to record values at that location in program execution.

The new code at location 454 ends at a jump instruction of location 458 that jumps to instruction P3. Instructions P1 and P3 have been inserted in space formerly occupied by atomic block 434, which has been relocated to location 460. Thus, when the proxy space code is executed control transfers to a location after the original position of the replaced instruction. This approach allows the replay system to execute the new replaced instructions.

When location 460 is reached, instructions Instr 5, Instr 6, Instr 7 of the atomic block are executed. The atomic block 434 terminates at a new jump instruction 462 that transfers control back to the end of the original code, at location 464. Execution continues at that point. This approach preserves the original instructions that were displaced from the atomic block. Atomic blocks of instructions may be moved to a different location, and new instructions are inserted, to be executed in place of the atomic blocks. The foregoing approach can redirect any instruction of any length, which is important for processor instruction sets that include variable length instructions. Further, the approach can configure the code to execute any amount of new code upon redirection to the proxy space. The foregoing approach also maintains the integrity of all original instructions of an application.

At step 422, the process of step 412 to step 420 is repeated for all instructions.

At step 424, the process adds core replay code and wrapper functions to the binary file. The core replay code and wrapper functions implement record and replay functions of the replay system.

Figure 5:
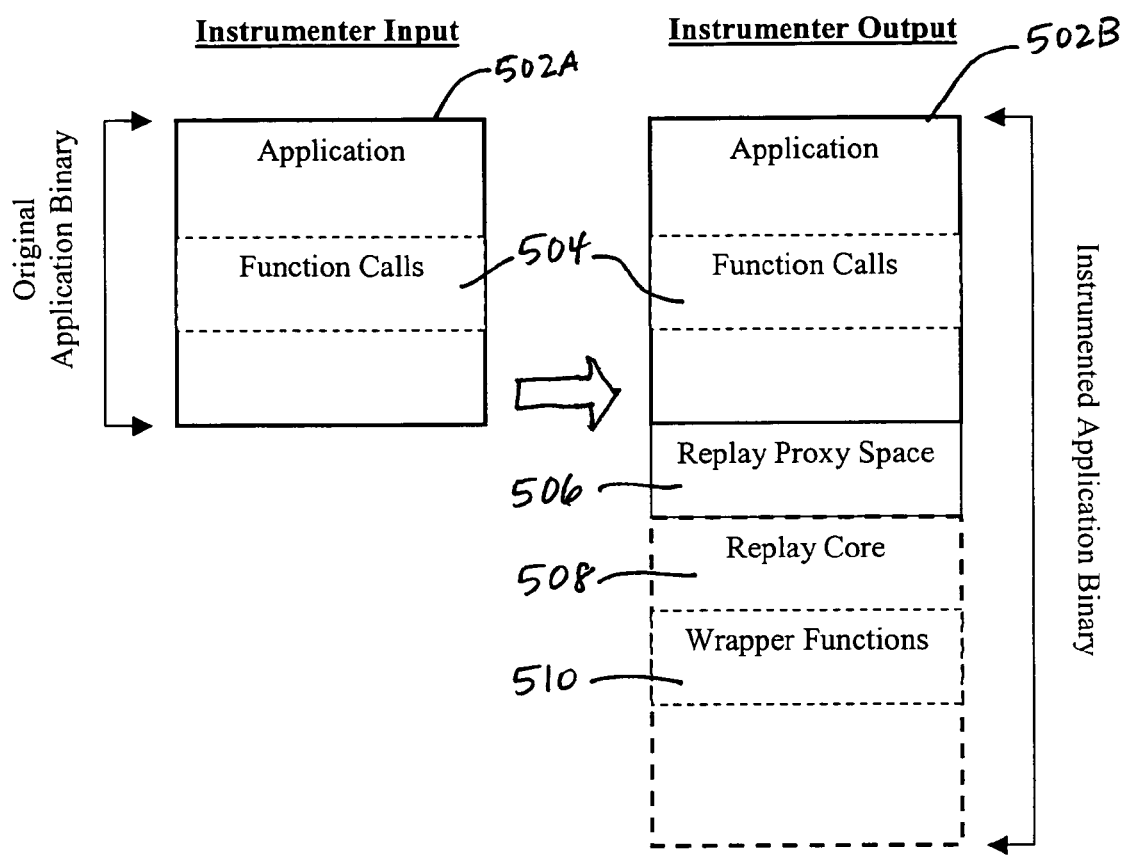
FIG. 5 is a block diagram illustrating transformation of an application binary file into an instrumented application binary file with replay system components.

FIG. 5 is a block diagram illustrating transformation of an application binary file into an instrumented application binary file with replay system components. An original application binary file 502A comprises application code that may include one or more function calls 504. Applying the process of FIG. 4A to original binary file 502A transforms the original binary file to an instrumented binary file 502B that includes a replay proxy space 506, and a replay core 508 having wrapper functions 510.

Replay proxy space 506 includes instructions, such as the instructions of locations 454, 458 of FIG. 4C, that save processor register states, call wrapper functions in the replay core 508, and restore register states. As described above for FIG. 4A, an instrumentation process modifies an application binary file to redirect all nondeterministic calls and instructions first into the appended proxy space 506. The proxy space 506 is used to preserve any state that is specific to the calling code. Such state may consist of registers that must be saved. The proxy call then makes a call into the corresponding function wrapper inside the replay core 508.

Wrapper functions 510 in replay core 508 call system functions on behalf of an application. When the replay system 130 is operating in record mode, replay wrapper functions 510 record all non-deterministic output of the application. Thus, in record mode, the wrapper functions 510 are responsible for recording any nondeterministic data that will be returned by the function inside a replay stream. Further, the wrapper functions 510 implement proxy code for each non-deterministic system method or call that an application may use.

In replay mode, wrapper functions 510 replay non-deterministic output. Wrapper functions 510 also handle asynchronous data updates, and return replayed information to instructions in the proxy space 506 that called the wrapper functions. Thus, in replay mode, the wrapper functions 510 are responsible for writing the same data that was recorded into the output data. The wrapper functions 510 that returns control the proxy space 506, which restores any state that was saved before entering the wrapper functions. In many cases, the proxy call may be skipped, and the function call can be redirected directly into a wrapper function residing in the replay core 508. This approach is appropriate if no state needs to be preserved or restored, based on the nature of the call.

The replay core 508 also implements miscellaneous functions to support the function wrappers. For example, code in replay core 508 creates and prepares a permanent storage area to save the replay data. In an embodiment, the storage area is accessed using a streaming mechanism. When the storage area is ready, the replay core 508 moves nondeterministic data that is recorded from the function wrappers and writes the data to the streams. The streams may interact with a file system on a hard disk or other medium, or interface with a remote network server on a LAN, WAN or the Internet. Replay core 508 also implements callback managers and other logic to support recording and replaying asynchronous function calls using the approaches described above. Replay core 508 also implements logic for performing thread context switching, interrupt trapping, and other recording and replay functions previously described.

Replay core 508 also implements state recording functions that store type-value pairs for program variables or system variables that represent program state or system state, in association with sync point values representing the time at which a state change occurred. State values are stored only when a state change occurs rather than all state values associated with all method calls of an application. In effect, this approach imposes a throttling effect that reduces the amount of stored data associated with capturing repeated application calls to functions that do not result in any state change.

In replay mode, replay core 508 is configured to open a specified replay data storage file, and then read in the requested nondeterministic data from the stream for the function wrapper. The replay core 508 also is responsible for checking that the application binary is compatible with the selected replay stream.

4.0 SOFTWARE DEVELOPMENT MANAGEMENT USING REPLAY SYSTEM

4.1 User Interface Example

In an embodiment, the replay system 130 is implemented in a set of program and data files that a developer uses to develop, test or debug applications. In one particular embodiment, described in this section, the replay system 130 is used to develop game applications. This section describes an example installation and user interface mechanism for using an implementation of the replay system 130 with the Microsoft XBOX platform; other embodiments may be implemented, installed and used in a different manner for different platforms. Thus, this section merely presents one example, and is not intended to limit the scope of all possible embodiments.

A set of distribution files comprising replay system 130 is normally placed in a build tree with other third-party tools or APIs that a developer may be using with an XBOX title. For example, the replay system distribution may be stored in a folder named C:/MyTitle/3rd Party/Replay. A user extracts or installs distribution files of replay system 130 to this directory. The user may add the 'Lib' directory to a lib path, and the 'Include' directory to the include path so that the user's compiler can find replay system 130 libraries and include files. Alternatively, the user can use full paths when referencing the libraries and header files.

To record and playback sessions, it is necessary to install replay system 130 on a game title that is under development. In an embodiment, installation comprises:

1. Make the first line of code that the title executes in main( ): ReplayStaticInit( ); This line can be placed in an #ifdef statement with a REPLAY option.

2. Include 'ReplayLib.h' in the same C or CPP file as main( ). For example: #include "c:/MyTitle/3rdParty/Replay/Include/ReplayLib.h" If the title is single-player and does not link against XOnline.lib, then statically link against only the following libraries: ReplayCoreModules-Xbox.lib; ReplayCore-Xbox.lib. If the title is multi-player, or links against XOnline.lib, then statically link against only ReplayNetworkModules-Xbox.lib and ReplayCore-Xbox.lib. A title must link against either ReplayNetworkModules-Xbox.lib or ReplayCoreModules-Xbox.lib, but not both at the same time.
3. Edit 'Ini/replay_app_xbox.ini' and change the 'launch_xbe' option to the name of the title's XBE.
4. Compile the title, and run 'ReplayInstrumenter.exe' on the compiled EXE. The ReplayInstrumenter program performs an instrumentation process on the executable binary file. Instrumentation processes are described further herein in other sections. A sample 'Instrument.bat' file included gives an example of using this command. A copy is reproduced at Table 1A. The developer should edit this script for the title and run it as the last step in the build process.
5. Create an XBE image normal using the instrumented EXE from the previous step. This is done with the 'imagebld' XBOX utility. Edit the sample 'Instrument.bat' script included with the replay system 130 to automate this step for the title.
6. Using the 'Instrument.bat' script, deploy the XBE and Replay config files to the XBOX.

TABLE 1A

EXAMPLE INSTRUMENT.BAT FILE

@echo off
REM
*******************************************************
*
REM
REM This script will instrument your target application with ReplayDIRECTOR,
REM as well as place config files on the default target Xbox.
REM
REM 'REPLAYDIR' is where Replay files are located.
REM 'TARGETDIR' is the directory containing the target EXE.
REM 'TARGETEXE' is the EXE that will be instrumented. Not a full path, just the EXE name.
REM 'DESTEXE' is the instrumented EXE location. Specify a full path if you wish.
REM 'DESTXBE' is the XBE image created from the instrumented DESTEXE.
Use a full path.
REM
REM NOTE: This script can be run from any directory.
REM NOTE: '%TARGETDIR%\%TARGETEXE' should point to your target EXEs full path.
REM
REM
*******************************************************
*
set LOCALVOL="C:"
set REPLAYDIR=%LOCALVOL%\Projects\ttl\Replay
set XBOXDESTPATH=xe: \ttl\
set TARGETDIR=%LOCALVOL%\Projects\ttl\ttl\code\XBoxRelease
set TARGETEXE=ttl.exe
set DESTEXE=ttl.exe
set DESTXBE=ttl_release.xbe
echo.
echo.
echo Instrumenting target application with ReplayDIRECTOR . . .
%REPLAYDIR%\ReplayInstrumenter.exe %TARGETDIR%
%TARGETEXE% -out
%DESTEXE% -platform xbox -db %REPLAYDIR% -launch_name
%DESTXBE% -force -

TABLE 1A-continued

EXAMPLE INSTRUMENT.BAT FILE embedded_config %REPLAYDIR%\Ini\embedded.ini -no_stack_alloc
echo.
echo Building the XBE image . . .
echo.
imagebld /OUT:"%DESTXBE%" /stack:"65536" /nologo
/testid:"0x45530018"
/testname: "25-To-Life" "%DESTEXE%"
echo.
echo Installing XBE and config files on the Xbox . . .
echo.
REM Create the Launcher INI file . . .
echo D: \%DESTXBE% > %REPLAYDIR%\Ini\ReplayLauncher.ini
REM Copy replay files . . .
xbcp /y "%DESTXBE%" "%XBOXDESTPATH%\%DESTXBE%"
xbmkdir "%XBOXDESTPATH%\Replay"
xbcp /y "%REPLAYDIR%\Ini\ReplayLauncher.ini"
"%xBOXDESTPATH%\Replay"
xbcp /y "%REPLAYDIR%\ReplayLauncher.xbe"
"%XBOXDESTPATH%\zReplayLauncher.xbe"
xbcp /y "%REPLAYDIR%\ReplayLauncherKeyboard.xbe"
"%XBOXDESTPATH%\zReplayLauncherKeyboard.xbe"
xbcp /ry "%REPLAYDIR%\Media" "%XBOXDESTPATH%\Media"
echo.
echo All done!
echo.

In one embodiment, the ReplayInstrumenter program of the replay system 130 provides user options for modifying its operation. Generally, ReplayInstrumenter can be run from any directory. The command syntax is: ReplayInstrumenter <app dir><app EXE or INI>\[-out <file>] [-platform <platform>] [-force]. The ReplayInstrumenter has the command line options shown in Table 1B:

TABLE 1B

EXAMPLE COMMAND LINE OPTIONS

| Argument/Option | Description |
|---|---|
| <app dir> | The directory where the target application EXE is located. This is usually the output directory. |
| <app EXE or INI> | The filename of the target EXE to be instrumented, without a full path. The instrumenter looks in <app dir> for this file. |
| -out <file> | The destination filename of the instrumented EXE that will be created. This can be a full path. |
| -platform <platform> | This should specify the target platform. (e.g. pc, xbox) |
| -force | This will force the target EXE to be instrumented, even if it appears the destination file is already up-to-date with the target EXE. |

The ReplayInstrumenter must be able to locate the PDB file associated with the target EXE. If the ReplayInstrumenter cannot locate the PDB file, it will display an error indicating where the PDB file should be. Therefore, developers should put the PDB file in the directory indicated by the error message and run the instrumenter again.

By default, replay system 130 records whenever a developer runs a title. Everything is recorded as the game is played, and written to the utility drive. A developer can disable auto-recording by modifying the 'default_record' setting in 'replay_xbox.ini'. If the default recording option is OFF (set to '0'), a user can start a recording session by holding down both triggers and pressing the BLACK button on the controller. This will reboot the XBOX and run the title in recording mode.

Data relating to a session is placed in the 'ReplaySessions' directory located on the Utility Drive. For example: Z:\ReplaySessions\

Replay system 130 saves the last five sessions for each application that is recorded in this directory. Each session is placed in its own directory named '1' through '5'. The most recent session is under a directory named '1'. For example: Z:\ReplaySessions\1

As each new session is recorded, the session number is incremented. '1' will become '2', '2' will become '3', etc. The oldest session, usually '5', will be removed.

To replay a recorded session from the XBOX, the user presses both triggers down while pressing the BACK button. This will replay the most recently recorded session. To replay a recorded session from a debugger (e.g. MSVC), the title is run with the '-replay' command line option. This will replay the most recently recorded session from the debugger. To replay a specific session, the path to the session is specified on the command line with the '-replaySession <SessionDir>' option. For example: myTitle.xbe-replaySession Z:/ReplaySessions/4

While in replay mode, the replay can be controlled using the XBOX controller with the controls shown in Table 2:

TABLE 2

EXAMPLE REPLAY CONTROLS

| Action | Button |
| --- | --- |
| Pause | Y |
| Play | A |
| Slow Playback Down | X |
| Speed Playback Up | B |
| Reboot to Record Mode | Both Triggers & BLACK |

A user may perform debugging during replay. The replay system 130 does not affect the ability to step through source code in any way. The user can set breakpoints, inspect data and perform any normal debugging functions. Using Visual Studio, the PDB files are valid with replay system 130 installed on the application. At any point during the replaying of a session, a user can attach a debugger such as Visual Studio and step through the source code associated with the application.

A user can save a session by copying or moving the session data from the 'Z:\ReplaySessions' directory. The directories listed herein (e.g., Z:\ReplaySessions\1) each contain a replay session.

Replay sessions can be replayed from the command line, or the debugger, using the following command line parameters. To replay the most recent recorded session:

xbreboot <TargetApplication> -replay

To replay a specific session located on the XBOX utility drive:

xbreboot <TargetApplication> -replaySession\<ReplaySessionDirectory>

For example, to play the most recent recorded session:

xbreboot xe:\\myTitle\myTitle.xbe -replay

To play any recording on the XBOX utility drive, specify it as:

xbreboot xe:\\myTitle\myTitle.xbe -replaySession\Z:\ReplaySessions\4

In one embodiment, a distribution of replay system 130 includes or uses the files listed in Table 3:

TABLE 3

EXAMPLE DISTRIBUTION FILES

| File | Description |
| --- | --- |
| ReplayInstrumenter.EXE | The instrumenter application that is run to activate the replay system on a title. |
| Instrument.bat | A sample batch file demonstrating how to apply ReplayDIRECTOR to a title. Typically this is run as the last step in a build. |
| Include/ReplayLib.h | Header file that is included to call ReplayStaticInit( ) from main( ). |
| Ini/replay_xbox.ini | Config file containing general Replay options. Generally does not need to be edited. |
| Ini/replay_app_xbox.ini | Config file containing options specific to a title. A user may need to customize these settings for a title. |
| Lib/RepayCore-Xbox.lib | This lib is always statically linked to a title. |
| Lib/ReplayCoreModules-Xbox.lib | This lib is linked for most single-player games. |
| Lib/ReplayNetworkModules-Xbox.lib | This lib is linked for most multi-player and XboxLive games. |
| Z:\ReplaySessions\ (On the XBOX Util Drive) | This is the directory where recorded session data is placed. Each session is stored in a separate directory. Only the five most recent sessions are stored in this directory. |
| Z:\ReplaySavedSessions\ (On the XBOX Util Drive) | This is the directory to store recorded sessions to maintain on long-term basis. A user can place any number of recorded sessions in this directory. |

4.2 Example Bug Communication Process

The approaches herein provide numerous benefits to users. Bugs may be corrected far more rapidly than in prior approaches. The approaches herein also facilitate communicating bugs from one unit of an enterprise to another, such as from a QA team to a development team. One unit can transmit, using e-mail for example, a copy of a replay stream to another unit for replay at that other unit's location.

Figure 8:
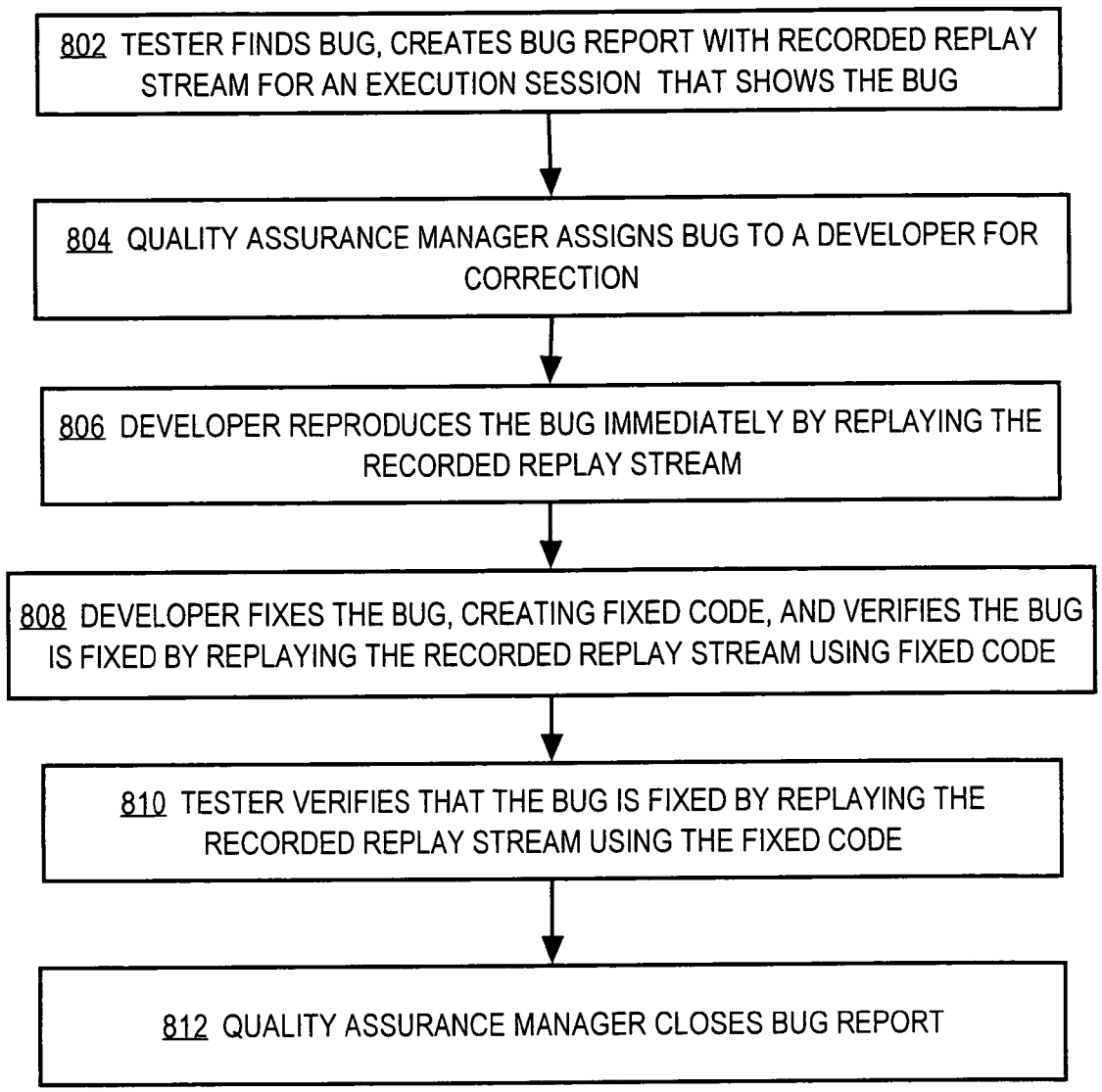
FIG. 8 is a flow diagram of an example software development management process according to an embodiment.

FIG. 8 is a flow diagram of an example software development management process according to an embodiment. In step 802, a software program tester finds a bug in an application program, prepares a recording of program execution that shows the bug using the replay system 130, and creates a bug report in association with a recorded replay stream. In step 804, a quality assurance manager assigns the bug to a developer for correction. Such an assignment can include communicating the bug report with the recorded replay stream. Thus, in the bug report, the tester and QA manager do not have to prepare a detailed description of how to reproduce the bug.

In step 806, the developer reproduces the bug by replaying the recorded replay stream. Step 806 presumes that the developer also runs the replay system to produce an instrumented application binary file that is equivalent to an instrumented binary file that the tester used when the bug was found at step 802. However, by playing the replay stream received with the bug report, the developer can reproduce the bug immediately without having to manipulate the application in a special way or provide particular input.

At step 808, the developer fixes the bug, resulting in creating fixed application code. The developer verifies that the bug is fixed by replaying the recorded replay stream using the fixed code. The developer also may communicate a copy of the fixed application code to the QA manager or tester.

At step 810, the tester verifies that the bug is fixed by replaying the previously recorded replay stream using the fixed code. If the bug is fixed, then replaying the recorded replay stream does not produce the bug. At step 812, the QA manager closes the bug report.

4.3 Other Uses and Benefits

The approaches herein enable performing memory and performance profiling. Because the approaches provide a consistently reproducible run-through of a program, the program can be tested on different platforms that may affect performance, and the approaches help isolate non-deterministic events or platform components that affect performance. For example, developers can repeatedly replay the same execution session while modifying application methods, functions or parameters and can observe the effect of such changes.

The approaches herein can be used to create foolproof demonstrations of computer programs. A user can record a demonstration session with a program at one point in time, and replay the demo later with assurance that the integrity of the demo cannot be affected by variances in input or by human error in running the demo.

The recording system provided herein has little performance impact on a program under test when the program is executing. Performance impact is important, for example, for development of game programs, in which a large amount of video information is generated and smooth, fast refreshing of the video display is essential for a good user experience. An embodiment has been found to result in no noticeable drop in the output frame rate of a typical game program.

No change in the software development workflow process is required; for example, developers do not need to use APIs in developing source code of applications.

Memory usage of embodiments is low. For example, an embodiment implemented on the Microsoft Xbox has been measured to require about 500K to 700K of main memory for execution. Data output of embodiments is also relatively small. For example, an embodiment has been found to generate about 1 MB of replay stream data per minute of program execution. The small, efficiently generated replay stream data files associated with embodiments enable users to conveniently transport replay stream data files to others.

5.0 IMPLEMENTATION MECHANISMS—HARDWARE OVERVIEW

Figure 9:
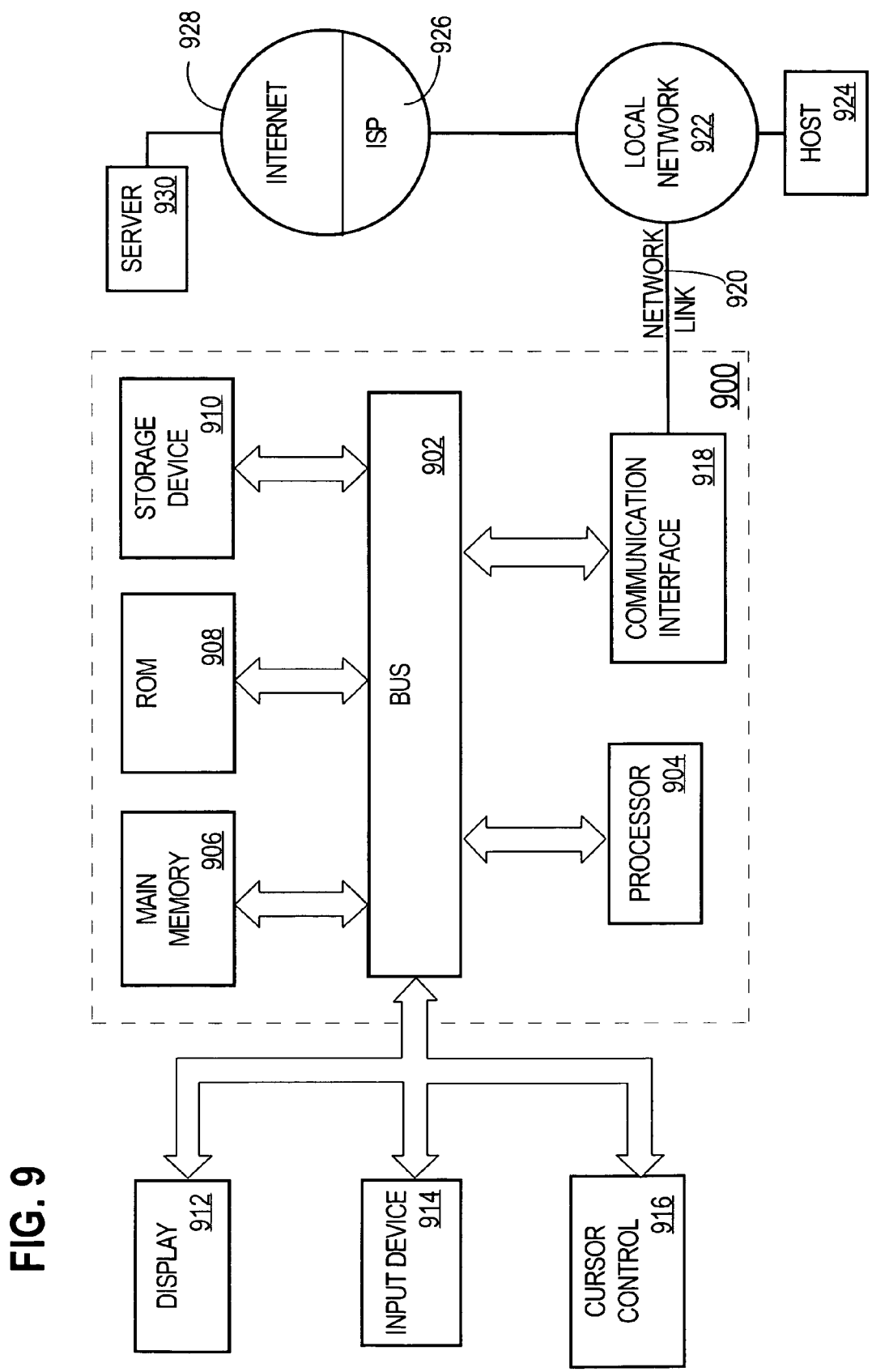
FIG. 9 is a block diagram that illustrates a computer system upon which an embodiment may be implemented.

FIG. 9 is a block diagram that illustrates a computer system 900 upon which an embodiment of the invention may be implemented. Computer system 900 includes a bus 902 or other communication mechanism for communicating information, and a processor 904 coupled with bus 902 for processing information. Computer system 900 also includes a main memory 906, such as a random access memory ("RAM") or other dynamic storage device, coupled to bus 902 for storing information and instructions to be executed by processor 904. Main memory 906 also may be used for storing temporary variables or other intermediate information during execution of instructions to be executed by processor 904. Computer system 900 further includes a read only memory ("ROM") 908 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 to a display 912, such as a cathode ray tube ("CRT"), for displaying information to a computer user. An input device 914, including alphanumeric and other keys, is coupled to bus 902 for communicating information and command selections to processor 904. Another type of user input device is cursor control 916, such as a mouse, trackball, stylus, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

The invention is related to the use of computer system 900 for recording and replaying computer programs. According to one embodiment of the invention, recording and replaying computer programs is provided by computer system 900 in response to processor 904 executing one or more sequences of one or more instructions contained in main memory 906. Such instructions may be read into main memory 906 from another computer-readable medium, such as storage device 910. Execution of the sequences of instructions contained in main memory 906 causes processor 904 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 904 for execution. Such a medium may take many forms, including but not limited to, non-volatile media, volatile media, and transmission media. Non-volatile media includes, for example, optical or magnetic disks, such as storage device 910. Volatile media includes dynamic memory, such as main memory 906. Transmission media includes coaxial cables, copper wire and fiber optics, including the wires that comprise bus 902. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 904 for execution. For example, the instructions may initially be carried on a magnetic disk of a remote computer. The remote computer can load the instructions into its dynamic memory and send the introductions over a telephone line using a modem. A modem local to computer system 900 can receive the data on the telephone line and use an infrared transmitter to convert the data to an infrared signal. An infrared detector can receive the data carried in the infrared signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network ("ISDN") card or a modem to provide a data communication connection to a corresponding type of telephone line. As another example, communication interface 918 may be a local area network ("LAN") card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider ("ISP") 926. ISP 926 in turn provides data communication services through the worldwide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are exemplary forms of carrier waves transporting the information.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918. In accordance with the invention, one such downloaded application provides for recording and replaying computer programs as described herein.

The received code may be executed by processor 904 as it is received, and/or stored in storage device 910, or other non-volatile storage for later execution. In this manner, computer system 900 may obtain application code in the form of a carrier wave.

6.0 EXTENSIONS AND ALTERNATIVES

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of modifying a computer program to support recording execution, the method comprising the computer-implemented steps of:
receiving an executable application binary;
modifying the executable application binary by adding one or more proxy code elements to result in creating a modified application binary, wherein upon execution of the modified application binary, the one or more proxy code elements create and store recorded information representing all non-deterministic events that cannot be predicted that occur during the execution;
receiving user input requesting replaying the execution;
in response to the user input, replaying the execution of the modified application binary, wherein replaying comprises providing the modified application binary with the recorded information representing the non-deterministic events that cannot be predicted; and
wherein the proxy code elements comprise event handlers to generate and provide the modified application binary with missing non-deterministic event information when a non-deterministic event occurs during the execution but not during the replaying.

2. The method as recited in claim 1, wherein the non-deterministic events include network input/output, file input/output, user input events, initiation of threads, interrupts, thread context switches, timer queries, shared memory accesses, and asynchronous system callbacks.

3. The method as recited in claim 1, wherein modifying the executable application binary includes adding recording buffer logic to the executable application binary, wherein the recording buffer logic buffers the recorded information in a buffer memory and stores the recorded information in a persistent data store only in response to occurrence of an exception during the execution.

4. The method as recited in claim 1, wherein modifying the executable application binary includes adding one or more proxy asynchronous callback handlers to the executable application binary, wherein the one or more proxy asynchronous callback handlers intercept an asynchronous callback that occurs during the execution and store information associated with the asynchronous callback in the recorded information.

5. The method as recited in claim 1, wherein modifying the executable application binary includes adding one or more proxy asynchronous callback handlers to the executable application binary; wherein the one or more proxy asynchronous callback handlers intercept an asynchronous callback that occurs during the execution and store information associated with the asynchronous callback in the recorded information; wherein during the replaying, the one or more proxy asynchronous callback handlers allow the asynchronous callback to pass through to the modified application binary only when the asynchronous callback occurs at a same sequential execution point as during the execution.

6. The method as recited in claim 1, wherein modifying the executable application binary includes adding one or more proxy exception handlers to the executable application binary, wherein the one or more proxy exception handlers intercept an exception that occurs during the execution and store information associated with the exception in the recorded information.

7. The method as recited in claim 1, wherein modifying the executable application binary includes adding one or more proxy exception handlers to the executable application binary; wherein the one or more proxy exception handlers intercept an exception that occurs during the execution and store information associated with the exception in the recorded information; wherein during the replaying, the one or more proxy exception handlers allow the exception to pass through to the modified application binary only when the exception occurs at a same sequential execution point as during the execution.

8. The method as recited in claim 7, wherein the one or more proxy exception handlers filter out the exception as an extraneous exception when the exception occurs during the replaying but is not in the recorded information.

9. The method as recited in claim 1, wherein modifying the executable application binary includes adding one or more hardware access proxy handlers to the executable application binary, wherein the one or more hardware access proxy handlers intercept and suppress requests of the modified application binary to access one or more hardware features that are not within a specified baseline hardware configuration.

10. A method as recited in claim 1, wherein modifying the executable application binary comprises:
determining one or more assembler instructions that correspond to one or more machine instructions in the executable application binary;
identifying one or more particular assembler instructions that perform non-deterministic system function calls;
substituting in one or more jump instructions, which reference proxy code for intercepting and recording information associated with the non-deterministic system function calls that occur during the execution, for the particular assembler instructions.

11. The method as recited in claim 10, wherein substituting includes determining that the one or more jump instructions require more space in the executable application binary than occupied by the particular assembler instructions, and moving an atomic block of instructions to another location in the executable application binary to provide room for the one or more jump instructions.

12. The method as recited in claim 10, wherein the proxy code is added to an end of the executable application binary.

13. The method as recited in claim 11, wherein moving an atomic block includes adding a return jump instruction to the atomic block that causes execution after the atomic block to resume at a same end point in the modified application binary at which the atomic block ended prior to the moving.

14. The method as recited in claim 1, wherein upon execution of the modified application binary, the one or more proxy code elements create and store recorded information representing all non-deterministic events that occur during the execution, without adversely affecting performance of the modified application binary during the execution.

15. A method as recited in claim 1, wherein modifying the executable application binary includes adding a memory request handler to the executable application binary, wherein during the replaying or during the execution, the memory request handler receives a request for a memory allocation from the modified application binary, provides a system memory allocation request to an operating system, receives a copy of memory values associated with memory that the system has allocated in response to the system memory allocation request, initializes the copy of memory values with new memory values, and provides the new memory values to the modified application binary.

16. The method as recited in claim 15, wherein the memory request handler initializes the copy of memory values with new memory values by generating a plurality of pseudo-random values based on a deterministic pseudo-random function and a specified seed value.

17. The method as recited in claim 16, wherein the specified seed value is stored in the recorded information during the execution.

18. The method as recited in claim 1, wherein the proxy code elements generate and provide the modified application binary with modified replay information in response to detecting that a value generated during the replaying is different than another value of the same type that is in the recorded information and that was generated during the execution.

19. A computer-readable medium, comprising volatile or non-volatile media, carrying one or more sequences of instructions for modifying a computer program to support recording execution, which instructions, when executed by one or more processors, cause the one or more processors to carry out the steps of:
receiving an executable application binary;
modifying the executable application binary by adding one or more proxy code elements to result in creating a modified application binary, wherein upon execution of the modified application binary, the one or more proxy code elements create and store recorded information representing all non-deterministic events that cannot be predicted that occur during the execution;
receiving user input requesting replaying the execution;
in response to the user input, replaying the execution of the modified application binary, wherein replaying comprises providing the modified application binary with the recorded information representing the non-deterministic events that cannot be predicted;
wherein the proxy code elements comprise event handlers to generate and provide the modified application binary with missing non-deterministic event information when a non-deterministic event occurs during the execution but not during the replaying.

20. The computer-readable medium as recited in claim 19, wherein the non-deterministic events include network input/output, file input/output, user input events, initiation of threads, interrupts, thread context switches, timer queries, shared memory accesses, and asynchronous system callbacks.

21. The computer-readable medium as recited in claim 19, wherein modifying the executable application binary includes adding recording buffer logic to the executable application binary, wherein the recording buffer logic buffers the recorded information in a buffer memory and stores the recorded information in a persistent data store only in response to occurrence of an exception during the execution.

22. The computer-readable medium as recited in claim 19, wherein modifying the executable application binary includes adding one or more proxy asynchronous callback handlers to the executable application binary, wherein the one or more proxy asynchronous callback handlers intercept an asynchronous callback that occurs during the execution and store information associated with the asynchronous callback in the recorded information.

23. The computer-readable medium as recited in claim 19, wherein modifying the executable application binary includes adding one or more proxy exception handlers to the executable application binary, wherein the one or more proxy exception handlers intercept an exception that occurs during the execution and store information associated with the exception in the recorded information.

24. The computer-readable medium as recited in claim 19, wherein modifying the executable application binary includes adding one or more hardware access proxy handlers to the executable application binary, wherein the one or more hardware access proxy handlers intercept and suppress requests of the modified application binary to access one or more hardware features that are not within a specified baseline hardware configuration.

25. The computer-readable medium as recited in claim 19, wherein modifying the executable application binary comprises:
determining one or more assembler instructions that correspond to one or more machine instructions in the executable application binary;
identifying one or more particular assembler instructions that perform non-deterministic system function calls;
substituting in one or more jump instructions, which reference proxy code for intercepting and recording information associated with the non-deterministic system function calls that occur during the execution, for the particular assembler instructions.

26. The computer-readable medium as recited in claim 19, wherein upon execution of the modified application binary, the one or more proxy code elements create and store recorded information representing all non-deterministic events that occur during the execution, without adversely affecting performance of the modified application binary during the execution.

27. The computer-readable medium as recited in claim 19, wherein modifying the executable application binary includes adding a memory request handler to the executable application binary, wherein during the replaying or during the execution, the memory request handler receives a request for a memory allocation from the executable application binary, provides a system memory allocation request to an operating system, receives a copy of memory values associated with memory that the system has allocated in response to the system memory allocation request, initializes the copy of memory values with new memory values, and provides the new memory values to the modified application binary.

28. The computer-readable medium as recited in claim 27, wherein the memory request handler initializes the copy of memory values with new memory values by generating a plurality of pseudo-random values based on a deterministic pseudo-random function and a specified seed value.

29. An apparatus for modifying a computer program to support recording execution, comprising:
   means for receiving an executable application binary;
   means for modifying the executable application binary by adding one or more proxy code elements to result in creating a modified application binary, wherein upon execution of the modified application binary, the one or more proxy code elements create and store recorded information representing all non-deterministic events that cannot be predicted that occur during the execution;
   means for receiving user input requesting replaying the execution;
   means for replaying the execution of the modified application binary in response to the user input, wherein replaying comprises providing the modified application binary with the recorded information representing the non-deterministic events that cannot be predicted; and
   wherein the proxy code elements comprise event handlers to generate and provide the modified application binary with missing non-deterministic event information when a non-deterministic event occurs during the execution but not during the replaying.

30. The apparatus as recited in claim 29, wherein the non-deterministic events include network input/output, file input/output, user input events, initiation of threads, interrupts, thread context switches, timer queries, shared memory accesses, and asynchronous system callbacks.

31. The apparatus as recited in claim 29, wherein the means for modifying the executable application binary includes adding means for adding recording buffer logic to the executable application binary, wherein the recording buffer logic buffers the recorded information in a buffer memory and stores the recorded information in a persistent data store only in response to occurrence of an exception during the execution.

32. The apparatus as recited in claim 29, wherein the means for modifying the executable application binary includes adding one or more proxy asynchronous callback handlers to the executable application binary, wherein the one or more proxy asynchronous callback handlers intercept an asynchronous callback that occurs during the execution and store information associated with the asynchronous callback in the recorded information.

33. The apparatus as recited in claim 29, wherein the means for modifying the executable application binary includes means for adding one or more proxy exception handlers to the executable application binary, wherein the one or more proxy exception handlers intercept an exception that occurs during the execution and store information associated with the exception in the recorded information.

34. An apparatus as recited in claim 29, wherein the means for modifying the executable application binary includes adding one or more hardware access proxy handlers to the executable application binary, wherein the one or more hardware access proxy handlers intercept and suppress requests of the modified application binary to access one or more hardware features that are not within a specified baseline hardware configuration.

35. The apparatus as recited in claim 29, wherein the means for modifying the executable application binary comprises:
   means for determining one or more assembler instructions that correspond to one or more machine instructions in the executable application binary;
   means for identifying one or more particular assembler instructions that perform non-deterministic system function calls;
   means for substituting in one or more jump instructions, which reference proxy code for intercepting and recording information associated with the non-deterministic system function calls that occur during the execution, for the particular assembler instructions.

36. The apparatus as recited in claim 29, wherein upon execution of the modified application binary, the one or more proxy code elements create and store recorded information representing all non-deterministic events that occur during the execution, without adversely affecting performance of the modified application binary during the execution.

37. The apparatus as recited in claim 29, wherein the means for modifying the executable application binary includes means for adding a memory request handler to the executable application binary, wherein during the replaying or during the execution, the memory request handler receives a request for a memory allocation from the modified application binary, provides a system memory allocation request to an operating system, receives a copy of memory values associated with memory that the system has allocated in response to the system memory allocation request, initializes the copy of memory values with new memory values, and provides the new memory values to the modified application binary.

38. The apparatus as recited in claim 37, wherein the memory request handler initializes the copy of memory values with new memory values by generating a plurality of pseudo-random values based on a deterministic pseudo-random function and a specified seed value.

39. An apparatus for modifying a computer program to support recording execution, comprising:
   a network interface that is coupled to the data network for receiving one or more packet flows therefrom;
   a processor;
   one or more stored sequences of instructions which, when executed by the processor, cause the processor to carry out the steps of:
      receiving an executable application binary;
      modifying the executable application binary by adding one or more proxy code elements to result in creating a modified application binary, wherein upon execution of the modified application binary, the one or more proxy code elements create and store recorded information representing all non-deterministic events that cannot be predicted that occur during the execution;

receiving user input requesting replaying the execution;

in response to the user input, replaying the execution of the modified application binary, wherein replaying comprises providing the modified application binary with the recorded information representing the non-deterministic events that cannot be predicted; and wherein the proxy code elements comprise event handlers to generate and provide the modified application binary with missing non-deterministic event information when a non-deterministic event occurs during the execution but not during the replaying.

40. The apparatus as recited in claim 39, wherein the non-deterministic events include network input/output, file input/output, user input events, initiation of threads, interrupts, thread context switches, timer queries, shared memory accesses, and asynchronous system callbacks.

41. The apparatus as recited in claim 39, wherein the instructions for modifying the executable application binary include instructions for adding recording buffer logic to the executable application binary, wherein the recording buffer logic buffers the recorded information in a buffer memory and stores the recorded information in a persistent data store only in response to occurrence of an exception during the execution.

42. The apparatus as recited in claim 39, wherein the instructions for modifying the executable application binary include instructions for adding one or more proxy asynchronous callback handlers to the executable application binary, wherein the one or more proxy asynchronous callback handlers intercept an asynchronous callback that occurs during the execution and store information associated with the asynchronous callback in the recorded information.

43. The apparatus as recited in claim 39, wherein the instructions for modifying the executable application binary includes instructions for adding one or more proxy exception handlers to the executable application binary, wherein the one or more proxy exception handlers intercept an exception that occurs during the execution and store information associated with the exception in the recorded information.

44. The apparatus as recited in claim 39, wherein the instructions for modifying the executable application binary includes instructions for adding one or more hardware access proxy handlers to the executable application binary, wherein the one or more hardware access proxy handlers intercept and suppress requests of the modified application binary to access one or more hardware features that are not within a specified baseline hardware configuration.

45. The apparatus as recited in claim 39, wherein the instructions for modifying the executable application binary comprises sequences of instructions for:

determining one or more assembler instructions that correspond to one or more machine instructions in the executable application binary;

identifying one or more particular assembler instructions that perform non-deterministic system function calls;

substituting in one or more jump instructions, which reference proxy code for intercepting and recording information associated with the non-deterministic system function calls that occur during the execution, for the particular assembler instructions.

46. The apparatus as recited in claim 39, wherein upon execution of the modified application binary, the one or more proxy code elements create and store recorded information representing all non-deterministic events that occur during the execution, without adversely affecting performance of the modified application binary during the execution.

47. The apparatus as recited in claim 39, wherein modifying the executable application binary includes adding a memory request handler to the executable application binary, wherein during the replaying or during the execution, the memory request handler receives a request for a memory allocation from the modified application binary, provides a system memory allocation request to an operating system, receives a copy of memory values associated with memory that the system has allocated in response to the system memory allocation request, initializes the copy of memory values with new memory values, and provides the new memory values to the modified application binary.

48. The apparatus as recited in claim 47, wherein the memory request handler initializes the copy of memory values with new memory values by generating a plurality of pseudo-random values based on a deterministic pseudo-random function and a specified seed value.

* * * * *

UNITED STATES PATENT AND TRADEMARK OFFICE
CERTIFICATE OF CORRECTION

PATENT NO.        : 7,506,318 B1
APPLICATION NO.   : 11/169522
DATED             : March 17, 2009
INVENTOR(S)       : Jonathan Lindo et al.

Page 1 of 1

It is certified that error appears in the above-identified patent and that said Letters Patent is hereby corrected as shown below:

Column 33, line 56, Claim 31, Delete "add-".

Column 33, line 57, Claim 31, Delete "ing".

Signed and Sealed this

First Day of September, 2009

David J. Kappos
*Director of the United States Patent and Trademark Office*